United States Patent
de Oliveira e Silva et al.

(10) Patent No.: US 12,253,192 B2
(45) Date of Patent: Mar. 18, 2025

(54) SEALED PIPELINE CONNECTION, PIPELINE SLEEVE, AND LOCKABLE PIPELINE SEALS AND METHOD OF MAKING SAME

(71) Applicant: LPS IP LLC, Rancho Cucamonga, CA (US)

(72) Inventors: Jose Anisio de Oliveira e Silva, Belo Horizonte (BR); Ryan Michael Sears, Costa Mesa, CA (US)

(73) Assignee: LPS IP, LLC, Rancho Cucamonga, CA (US)

( * ) Notice: Subject to any disclaimer, the term of this patent is extended or adjusted under 35 U.S.C. 154(b) by 0 days.

(21) Appl. No.: 18/019,765

(22) PCT Filed: Aug. 4, 2021

(86) PCT No.: PCT/US2021/044425
§ 371 (c)(1),
(2) Date: Feb. 3, 2023

(87) PCT Pub. No.: WO2022/031767
PCT Pub. Date: Feb. 10, 2022

(65) Prior Publication Data
US 2023/0287999 A1 Sep. 14, 2023

Related U.S. Application Data

(60) Provisional application No. 63/061,786, filed on Aug. 5, 2020.

(51) Int. Cl.
*F16L 17/02* (2006.01)
*F16L 21/04* (2006.01)

(52) U.S. Cl.
CPC ............... *F16L 17/02* (2013.01); *F16L 21/04* (2013.01)

(58) Field of Classification Search
CPC . F16L 17/02; F16L 17/06; F16L 17/08; F16L 17/0212; F16L 17/0218;
(Continued)

(56) References Cited

U.S. PATENT DOCUMENTS 2,188,925 A 2/1940 Bela
2,226,304 A * 12/1940 Dillon .................... F16L 17/10
279/157

(Continued)

FOREIGN PATENT DOCUMENTS

AR 034477 A1 2/2004
AU 5373290 A 10/1990
(Continued)

OTHER PUBLICATIONS

Notification of Transmittal of the International Search Report & Written Opinion, dated Nov. 12, 2021, pp. 1-9.
(Continued)

*Primary Examiner* — Eugene G Byrd
*Assistant Examiner* — L. Susmitha Koneru
(74) *Attorney, Agent, or Firm* — Victor H. Segura

(57) ABSTRACT

A lockable pipeline seal, pipeline sleeve, and sealed pipeline connection for a pipeline. The pipeline seal includes a ring-shaped body having a head along a first ring end and a tail along a second ring end of the ring-shaped body, with a body portion therebetween. The ring-shaped body has an outer surface and an inner surface along its periphery. A deflection surface and a base surface are defined along the outer surface. The deflection surface is at an angle to a horizontal axis of the ring-shaped body, and a recessed grip is defined along the inner surface. The ring-shaped body is compressible such that, when the pipeline seal is installed between the pipeline sleeve and the pipeline pipe, the deflection surface is urged against the pipeline pipe and the
(Continued)

recessed grip grippingly engages the pipeline sleeve whereby a locked seal is formed between the pipeline sleeve and the pipeline pipe.

27 Claims, 37 Drawing Sheets

(58) Field of Classification Search
CPC ..... F16L 21/04; F16L 13/0227; F16L 58/181; F16L 13/0263; F16L 15/02; F16L 15/10; F16L 19/04; F16L 23/20
See application file for complete search history.

(56) References Cited

U.S. PATENT DOCUMENTS

| | | | |
|---|---|---|---|
| 2,372,712 A | 4/1945 | Crawford | |
| 2,646,995 A | 7/1953 | Thompson | |
| 2,764,426 A | 9/1956 | Ahrens | |
| 2,794,758 A | 6/1957 | Harper et al. | |
| 2,895,747 A | 7/1959 | Julius et al. | |
| 2,919,936 A * | 1/1960 | Hurley | F16L 23/125 285/55 |
| 3,132,236 A | 5/1964 | Deininger | |
| 3,142,499 A | 7/1964 | Lang | |
| 3,192,612 A | 7/1965 | Elliott et al. | |
| 3,195,931 A | 7/1965 | Braunagel | |
| 3,217,922 A | 11/1965 | Glasgow | |
| 3,235,291 A | 2/1966 | Lewis | |
| 3,266,820 A | 8/1966 | Fernand et al. | |
| 3,284,108 A | 11/1966 | West | |
| 3,325,191 A | 6/1967 | Dick | |
| 3,453,004 A | 7/1969 | Toelke et al. | |
| 3,467,410 A | 9/1969 | Chandler | |
| 3,508,766 A | 4/1970 | Kessler et al. | |
| 3,516,689 A | 6/1970 | Binford et al. | |
| 3,537,731 A | 11/1970 | Reddy | |
| 3,653,688 A * | 4/1972 | Sakakibara | F16L 17/025 403/303 |
| 3,817,805 A | 6/1974 | Surikov et al. | |
| 3,890,483 A | 6/1975 | Webster | |
| 3,955,834 A | 5/1976 | Ahlrot | |
| 3,965,555 A | 6/1976 | Webster et al. | |
| 3,972,466 A | 8/1976 | Keith | |
| 4,182,519 A | 1/1980 | Wilson | |
| 4,277,091 A | 7/1981 | Hunter | |
| 4,400,019 A | 8/1983 | Fruck | |
| 4,611,833 A | 9/1986 | Lescaut | |
| 4,619,470 A | 10/1986 | Overath et al. | |
| 4,635,967 A | 1/1987 | Stephenson | |
| 4,640,532 A | 2/1987 | Pope | |
| 4,768,278 A * | 9/1988 | Pickering | B29C 66/81431 277/924 |
| 4,913,465 A | 4/1990 | Abbema et al. | |
| 5,009,737 A | 4/1991 | Lescaut | |
| 5,009,797 A | 4/1991 | Penny et al. | |
| 5,052,608 A | 10/1991 | McClure | |
| 5,104,152 A * | 4/1992 | Galfant | F16L 58/181 285/55 |
| 5,114,190 A * | 5/1992 | Chalmers | F16L 19/0231 285/423 |
| 5,163,715 A | 11/1992 | Rickard et al. | |
| 5,219,187 A | 6/1993 | Mikitka | |
| 5,282,652 A * | 2/1994 | Werner | F16L 58/182 285/55 |
| 5,346,261 A | 9/1994 | Abbema | |
| 5,348,211 A | 9/1994 | White et al. | |
| 5,405,171 A | 4/1995 | Allen et al. | |
| 5,480,196 A | 1/1996 | Adams, Jr. | |
| 5,547,228 A | 8/1996 | Abbema et al. | |
| 5,566,984 A * | 10/1996 | Abbema | F16L 13/0263 285/55 |
| 5,566,986 A | 10/1996 | Allen et al. | |
| 5,584,512 A | 12/1996 | Carstensen | |
| 5,634,672 A | 6/1997 | Stack et al. | |
| 5,685,572 A | 11/1997 | Linton et al. | |
| 5,779,276 A | 7/1998 | Allen | |
| 5,863,078 A | 1/1999 | Ball | |
| 5,964,981 A | 10/1999 | Nelson et al. | |
| 5,984,370 A | 11/1999 | Lewis | |
| 5,992,897 A | 11/1999 | Hill et al. | |
| 6,226,855 B1 | 5/2001 | Maine | |
| 6,294,042 B1 | 9/2001 | Nelson et al. | |
| 6,322,111 B1 * | 11/2001 | Brady | F16L 21/022 277/648 |
| 6,357,802 B1 | 3/2002 | Nozato et al. | |
| 6,375,226 B1 | 4/2002 | Dickinson et al. | |
| 6,719,186 B2 | 4/2004 | Mudge et al. | |
| 6,739,632 B1 | 5/2004 | Thomas et al. | |
| 6,863,313 B1 * | 3/2005 | DeLange | E21B 17/042 285/55 |
| 6,926,283 B2 * | 8/2005 | Janoff | F16L 23/20 277/606 |
| 7,080,667 B2 | 7/2006 | McIntyre | |
| 7,344,161 B2 | 3/2008 | Howard et al. | |
| 7,431,341 B2 | 10/2008 | McIntyre | |
| 7,722,085 B2 | 5/2010 | Pionetti | |
| 7,908,732 B2 | 3/2011 | Alliot et al. | |
| 8,186,685 B2 * | 5/2012 | Martin | E21B 33/1212 277/645 |
| 8,256,089 B2 | 9/2012 | Pionetti | |
| 8,397,766 B2 | 3/2013 | Rosen | |
| 8,398,119 B2 | 3/2013 | Kenworthy | |
| 8,596,692 B1 * | 12/2013 | Gourlay | F16L 23/04 285/365 |
| 8,622,094 B2 | 1/2014 | Dorsch et al. | |
| 8,714,597 B2 | 5/2014 | Venable et al. | |
| 8,794,637 B2 * | 8/2014 | Martin | F16L 23/18 277/645 |
| 8,942,552 B2 | 1/2015 | Pionetti et al. | |
| RE45,518 E * | 5/2015 | Martin | F16L 23/18 277/645 |
| 9,377,148 B2 | 6/2016 | Barnes | |
| 9,599,257 B2 | 3/2017 | Raber | |
| 9,915,383 B2 | 3/2018 | Compton et al. | |
| 9,982,814 B1 * | 5/2018 | Carstensen | E21B 33/10 |
| 10,047,892 B2 | 8/2018 | Barnes | |
| 10,274,108 B2 | 4/2019 | Barnes | |
| 10,533,690 B2 | 1/2020 | Barnes | |
| 10,562,235 B2 | 2/2020 | Pionetti et al. | |
| 11,047,513 B2 | 6/2021 | Barnes | |
| 11,067,467 B2 * | 7/2021 | Gamache | F16L 19/103 |
| 11,092,262 B2 | 8/2021 | Chalmers et al. | |
| 11,338,526 B2 | 5/2022 | Pionetti et al. | |
| 11,572,967 B2 | 2/2023 | Yakovchev et al. | |
| 2002/0157718 A1 | 10/2002 | Mason | |
| 2004/0070199 A1 | 4/2004 | Trivelli | |
| 2005/0189028 A1 | 9/2005 | Burkes | |
| 2005/0225089 A1 | 10/2005 | Ben-Horin | |
| 2005/0246883 A1 | 11/2005 | Alliot et al. | |
| 2006/0145479 A1 | 7/2006 | McIntyre | |
| 2006/0186602 A1 * | 8/2006 | Martin | E21B 33/1212 277/338 |
| 2007/0284872 A1 | 12/2007 | Pionetti | |
| 2010/0207380 A1 | 8/2010 | Venable et al. | |
| 2011/0094613 A1 | 4/2011 | Rosen | |
| 2011/0193339 A1 | 8/2011 | Kenworthy | |
| 2013/0240076 A1 | 9/2013 | Van Der Graaf | |
| 2013/0292936 A1 | 11/2013 | Rosen | |
| 2014/0047176 A1 | 2/2014 | Poddar | |
| 2014/0103638 A1 | 4/2014 | Compton et al. | |
| 2014/0116518 A1 | 5/2014 | Burkes | |
| 2014/0252757 A1 | 9/2014 | Raber | |
| 2015/0260318 A1 | 9/2015 | Goess-Saurau et al. | |
| 2016/0298811 A1 | 10/2016 | Burkes | |
| 2017/0045162 A1 | 2/2017 | Raber | |
| 2019/0316721 A1 | 10/2019 | Barnes | |

(56) References Cited

U.S. PATENT DOCUMENTS

| | | |
|---|---|---|
| 2022/0049800 A1 | 2/2022 | Hallot et al. |
| 2022/0136624 A1 | 5/2022 | Metcalf et al. |

FOREIGN PATENT DOCUMENTS

| | | |
|---|---|---|
| BR | 0301867 B1 | 8/2004 |
| BR | 112015022847 A2 | 7/2017 |
| CA | 1006016 A | 3/1977 |
| CA | 1050075 A | 3/1979 |
| CA | 2382454 A1 | 1/2002 |
| CA | 2431459 A1 | 12/2003 |
| CA | 2460297 A1 | 8/2005 |
| CA | 2817985 E | 5/2012 |
| CA | 2904609 C | 10/2014 |
| CN | 101694261 A | 4/2010 |
| CN | 103899857 A | 7/2014 |
| DE | 660158 C | 5/1938 |
| DE | 1872620 U | 5/1963 |
| DE | 2531932 C3 | 1/1977 |
| DE | 3315819 A1 | 10/1984 |
| EP | 0275055 A3 | 7/1989 |
| EP | 0366299 A3 | 5/1990 |
| EP | 0389462 A1 | 9/1990 |
| EP | 137189 B1 | 3/1991 |
| FR | 2416764 A1 | 9/1979 |
| FR | 2438788 A3 | 5/1980 |
| GB | 410120 A | 5/1934 |
| GB | 410196 A | 5/1934 |
| GB | 722070 A | 1/1955 |
| GB | 1022510 A | 3/1966 |
| GB | 1384614 A | 2/1975 |
| GB | 1444225 A | 7/1976 |
| GB | 1451190 A | 9/1976 |
| GB | 1480061 A | 7/1977 |
| GB | 1533233 A | 11/1978 |
| GB | 2298689 A | 9/1996 |
| GB | 2481065 A | 12/2011 |
| GB | 2481065 B | 12/2011 |
| GB | 2588919 A | 5/2021 |
| OA | 12986 A | 10/2006 |
| RU | 2023930 C1 | 11/1994 |
| RU | 2154221 C1 | 8/2000 |
| RU | 2157479 C1 | 10/2000 |
| RU | 20361 U1 | 10/2001 |
| RU | 2232334 C1 | 7/2004 |
| RU | 2236628 C1 | 9/2004 |
| RU | 2503873 C1 | 1/2014 |
| WO | 9014544 A1 | 11/1990 |
| WO | 1990014544 A1 | 11/1990 |
| WO | 9626384 A1 | 8/1996 |
| WO | 9821513 A1 | 5/1998 |
| WO | 0201103 A1 | 1/2002 |
| WO | 03062691 | 7/2003 |
| WO | 03062691 A1 | 7/2003 |
| WO | 2004011840 A1 | 2/2004 |
| WO | 2004015321 A1 | 2/2004 |
| WO | 2005019719 A1 | 3/2005 |
| WO | 2006109015 A1 | 10/2006 |
| WO | 2009048772 A1 | 4/2009 |
| WO | 2010041016 A1 | 4/2010 |
| WO | 2012069105 A1 | 5/2012 |
| WO | 2013136062 A1 | 9/2013 |
| WO | 2014164862 A1 | 10/2014 |
| WO | 2016001622 A1 | 1/2016 |
| WO | 2016185228 A1 | 11/2016 |

OTHER PUBLICATIONS

Notification of Transmittal of the International Search Report & Written Opinion, dated Nov. 2, 2021, pp. 1-9.
1st Substantive Examination Report of Saudi Arabia dated Dec. 29, 2023, pp. 1-14.
Communication of extended European search report dated Jul. 29, 2024, pp. 1-10.
Examination Report of Chile dated Jun. 7, 2024, pp. 1-28.
Examination Report of Morocco dated Apr. 21, 2023, pp. 1-6.
Response to Examination Report of Chile dated May 21, 2024, pp. 1-14.
Response to First Examination Report of Morocco (translated), claims, and marked up claims dated Nov. 26, 2023, pp. 1-6.

\* cited by examiner

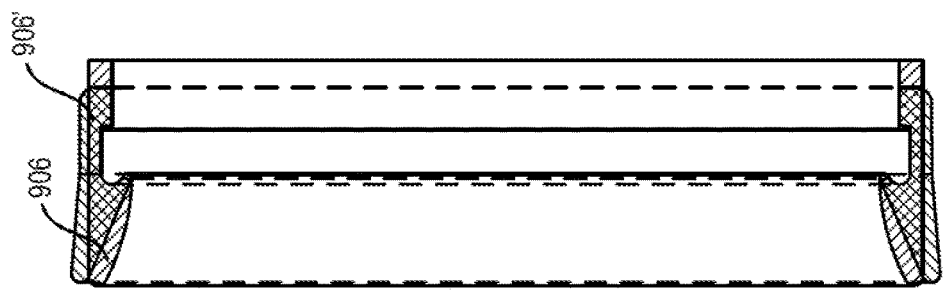
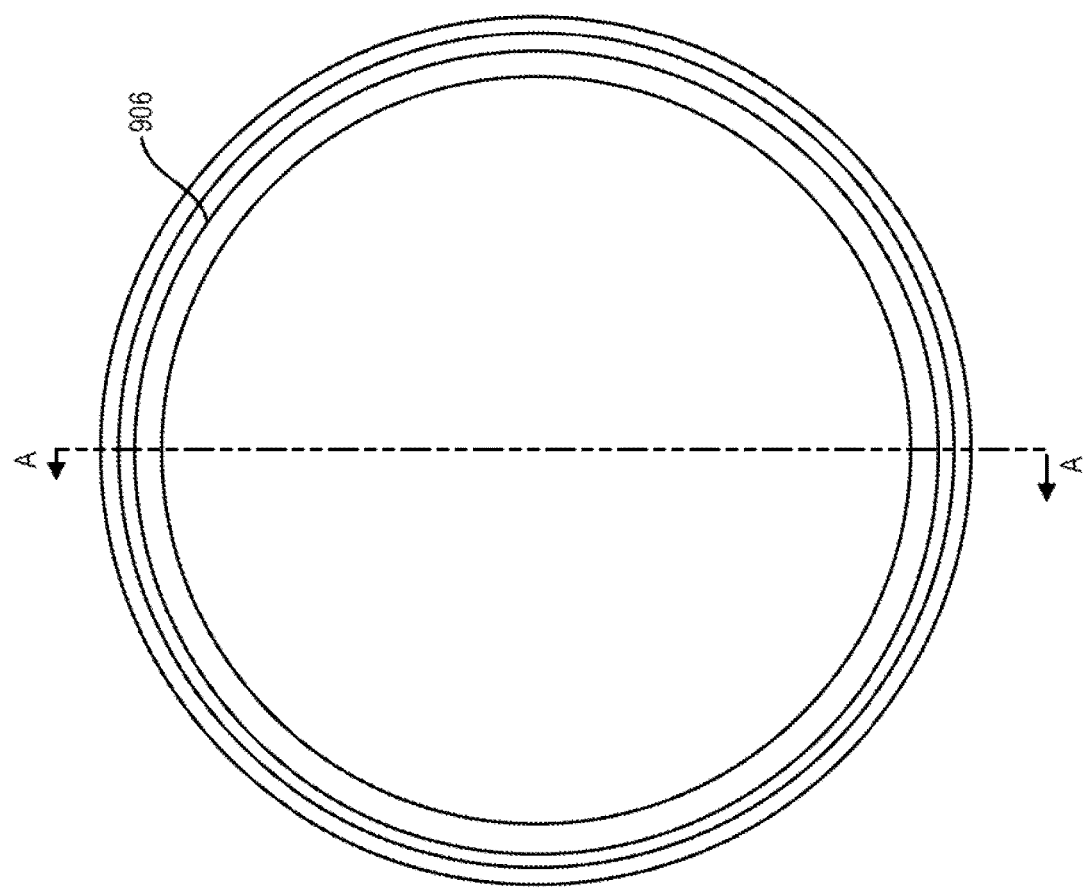

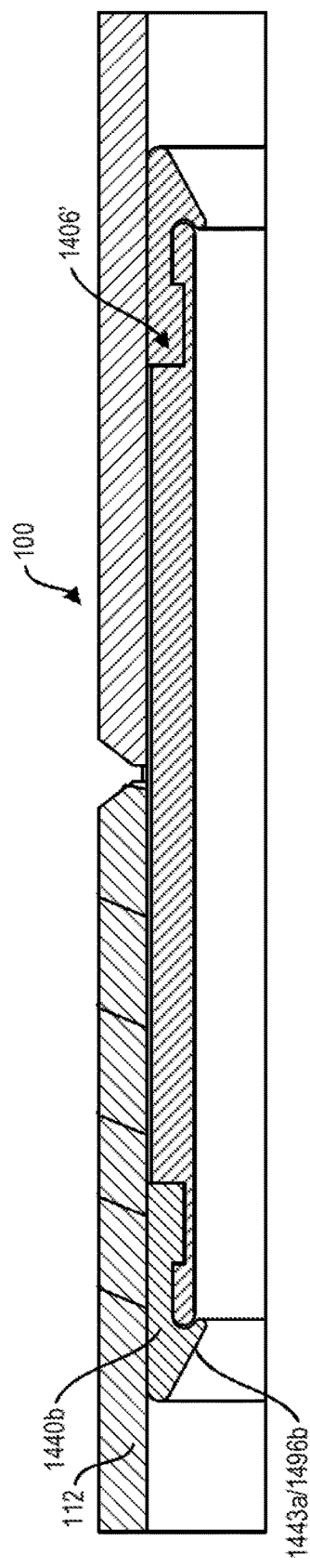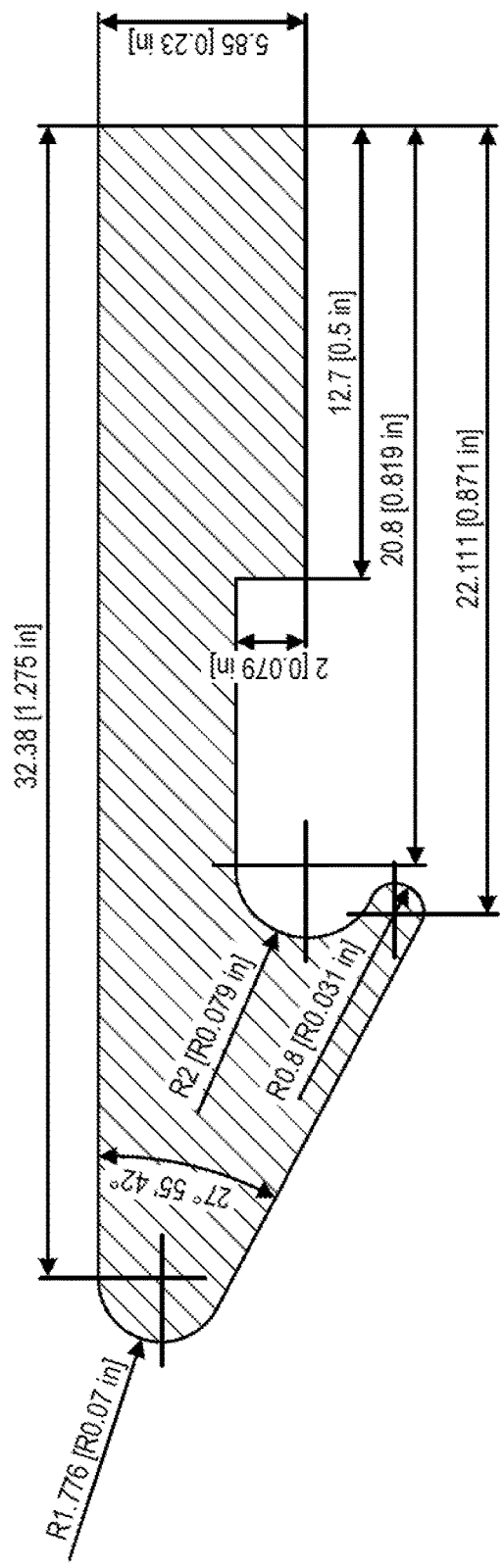
FIG. 15A
FIG. 15B

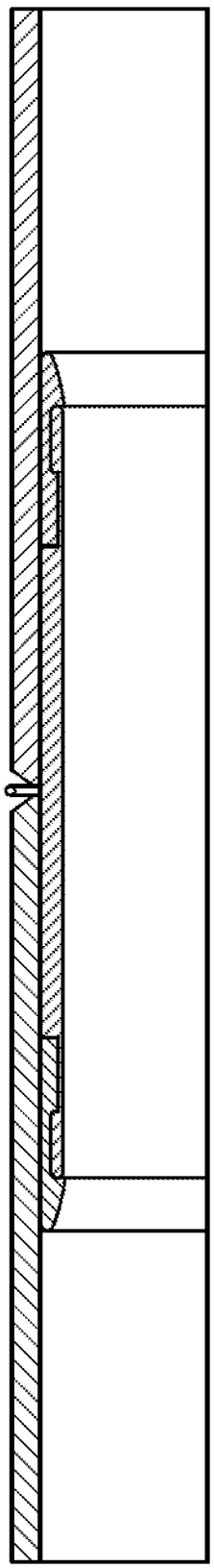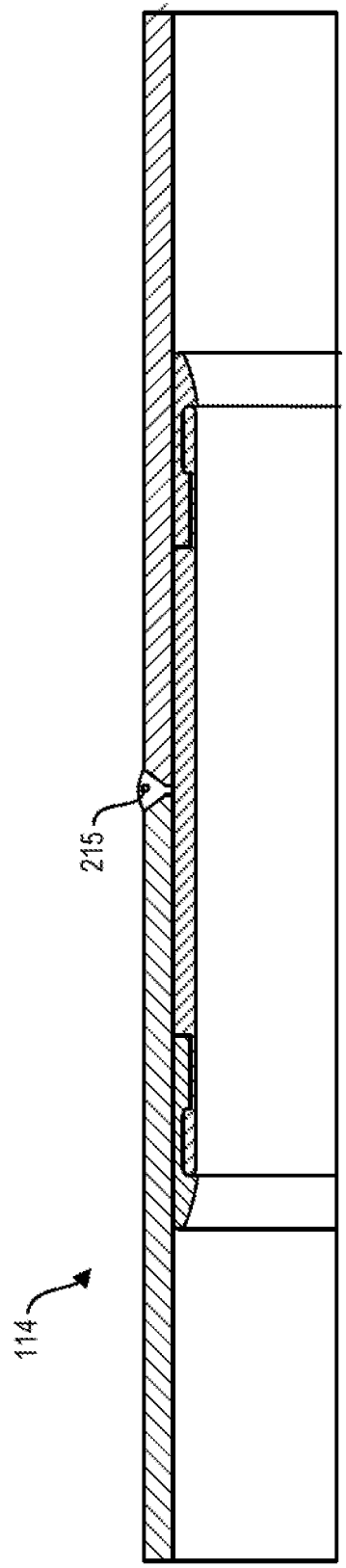

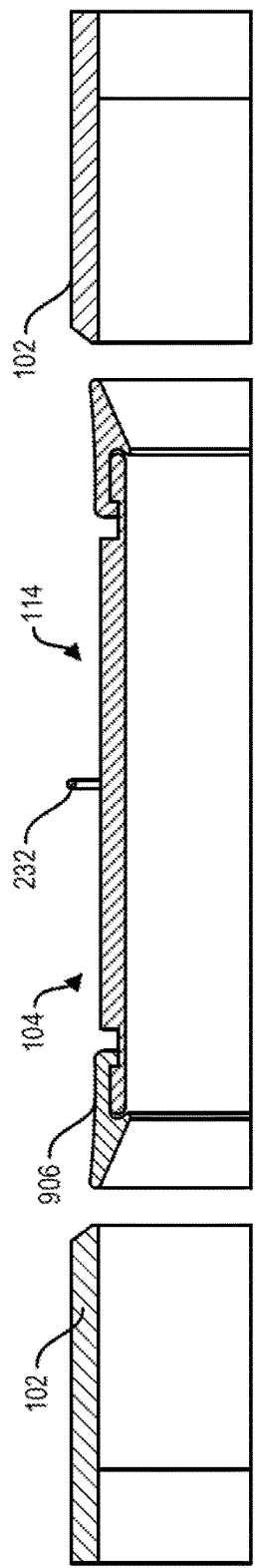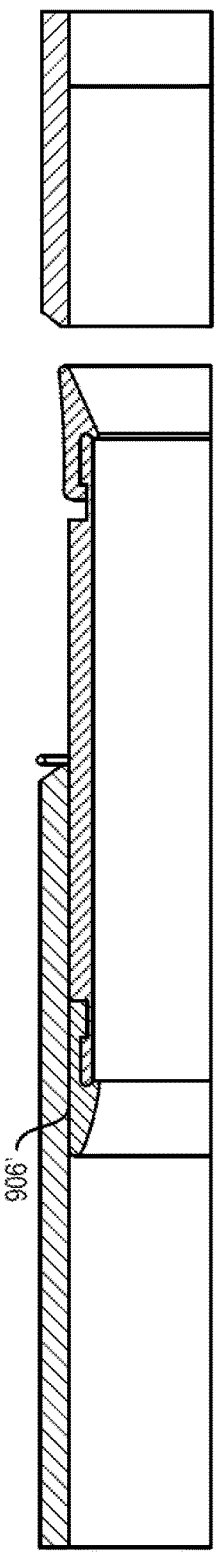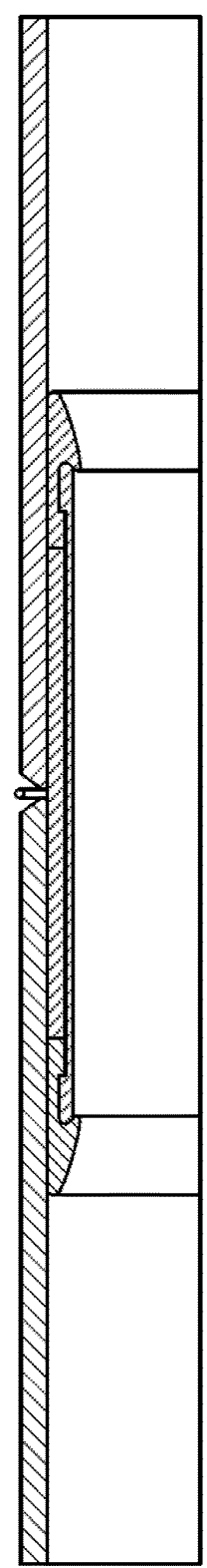

2100A - METHOD OF MAKING A SEALED PIPELINE

2180 – FORMING A PIPELINE SEAL SLEEVE BY INSTALLING LOCKABLE PIPELINE SEALS ONTO A PIPELINE SLEEVE BY:
- 2180A - BY POSITIONING A FIRST LOCKABLE PIPELINE SEAL ONTO AN OUTER SURFACE OF A FIRST SLEEVE END OF THE PIPELINE SLEEVE AND A SECOND LOCKABLE PIPELINE SEAL ONTO AN OUTER SURFACE OF A SECOND SLEEVE END OF THE PIPELINE SLEEVE
- 2180B - THE LOCKABLE PIPELINE SEAL COMPRISING A RING-SHAPED BODY HAVING A HEAD, A TAIL, AND A BODY PORTION THEREBETWEEN, THE LOCKABLE PIPELINE SEAL HAVING A PERIPHERAL SURFACE COMPRISING: AN OUTER SURFACE SHAPED TO CONFORM TO THE INNER SURFACE OF THE PAIR OF PIPELINE PIPES AND AN INNER SURFACE DEFINING A SEAL GRIP SHAPED TO CONFORM TO THE SLEEVE END OF THE PIPELINE SLEEVE

2182 – INSTALLING THE PIPELINE SEAL SLEEVE INTO A PAIR OF PIPELINE PIPES, EACH OF THE PAIR OF PIPELINE PIPES HAVING A FIRST PIPE END AND A SECOND PIPE END, BY:
- 2182A - INSERTING A FIRST SLEEVE END OF THE PIPELINE SEAL SLEEVE INTO THE FIRST PIPE END OF A FIRST OF THE PAIR OF PIPELINE PIPES AND
- 2182B - INSERTING A SECOND SLEEVE END OF THE PIPELINE SEAL SLEEVE INTO THE SECOND PIPE END OF A SECOND OF THE PAIR OF PIPELINES PIPES

2184 – FORMING A SEALED PIPELINE CONNECTION ABOUT THE PAIR OF PIPELINE PIPES BY:
- 2184A - PLACING A CONTACT PORTION OF A PERIPHERAL SURFACE OF THE LOCKABLE PIPELINE SEALS INTO SEALING ENGAGEMENT WITH THE PIPELINE PIPES, THE PIPELINE SLEEVE, AND/OR A LINER OF THE PIPELINE PIPES
- 2184B - GRIPPINGLY ENGAGING A RIM ALONG OF THE PIPELINE SLEEVE WITH THE SEAL GRIP
- 2184C - MAINTAINING A NON-CONTACT PORTION OF THE PERIPHERAL SURFACE OF THE LOCKABLE PIPELINE SEALS IN NON-CONTACT WITH THE PIPELINE PIPES, THE PIPELINE SLEEVE, AND A LINER OF THE PIPELINE PIPES

2186 - LOCKING THE LOCKABLE PIPELINE SEAL INTO THE SEALING ENGAGEMENT BY:
- 2186A - ALLOWING THE LOCKABLE PIPELINE SEAL TO FLOW UNDER COMPRESSION SUCH THAT THE CONTACT SURFACE IS URGED AGAINST AND CONFORMS TO A SHAPE OF THE PIPELINE PIPES, THE PIPELINE SLEEVE, AND A LINER OF THE PIPELINE PIPES IN CONTACT THEREWITH AND SUCH THAT A SEAL SPACE DEFINED THEREBETWEEN IS FILLED BY THE LOCKABLE PIPELINE SEAL

2188 - SECURING THE PIPELINE PIPES TOGETHER

FIG. 21A

2100B - METHOD OF SEALING A PIPELINE

2190 – FORMING A PIPELINE CONNECTION BETWEEN A PAIR OF PIPELINE PIPES AND A PIPELINE SLEEVE BY:

2190A - (OPTIONALLY) APPLYING A LINER INSIDE EACH OF THE PAIR OF PIPELINE PIPES;

2190B - POSITIONING A FIRST SLEEVE END OF A PIPELINE SLEEVE WITH A LOCKABLE PIPELINE SEAL THEREON INTO A FIRST PIPE END OF A FIRST OF THE PAIR OF PIPELINE PIPES;

2190C - POSITIONING A SECOND SLEEVE END OF A PIPELINE SLEEVE WITH THE LOCKABLE PIPELINE SEAL THEREON INTO A SECOND PIPE END OF A SECOND OF THE PAIR OF PIPELINE PIPES; AND

2190D - WITH THE PIPELINE SLEEVE POSITIONED THEREIN, SECURING THE FIRST PIPE END OF THE FIRST PIPELINE PIPE TO THE SECOND PIPE END OF THE SECOND PIPELINE PIPE

2192 – FORMING A FLUID TIGHT SEAL ABOUT THE PIPELINE CONNECTION BY:

2192A - PLACING A CONTACT SURFACE OF THE LOCKABLE PIPELINE SEAL INTO CONTACT WITH THE PIPELINE PIPE AND THE PIPELINE SLEEVE (AND OPTIONALLY THE PIPELINE LINER);

2192B - WHILE MAINTAINING A NON-CONTACT PORTION OF THE LOCKABLE PIPELINE SEAL IN NON-CONTACT WITH THE PIPELINE PIPE AND THE PIPELINE SLEEVE (AND OPTIONALLY THE PIPELINE LINER); AND

2192C - LOCKING THE FLUID TIGHT SEAL BY: PLACING THE LOCKABLE PIPELINE SEAL UNDER COMPRESSION SUCH THAT THE CONTACT SURFACES ARE URGED AGAINST THE PIPELINE PIPE AND THE PIPELINE SLEEVE (AND OPTIONALLY THE PIPELINE LINER)

FIG. 21B

SEALED PIPELINE CONNECTION, PIPELINE SLEEVE, AND LOCKABLE PIPELINE SEALS AND METHOD OF MAKING SAME

CROSS-REFERENCE TO RELATED APPLICATIONS

This application claims the benefit of U.S. Provisional Application No. 63/061,786 entitled filed on Aug. 5, 2020, the entire contents of which are hereby incorporated by reference herein to the extent not inconsistent with the present disclosure.

BACKGROUND

The present disclosure relates generally to pipelines. In particular, the present disclosure relates to sealing techniques for use in pipelines.

Pipelines are used to transport fluids between locations. The pipelines may be formed from a series of tubulars connected together to form a fluid passage for flow of the fluids therethrough. The tubulars may be connected together by connections, such as threads. Examples of connections are provided in Patent/Application Nos. US2007284872, US2006145479, US2005225089, U.S. Pat. Nos. 8,596,692, 7,431,341, 6,357,802, and 5,346,261, the entire contents of which are hereby incorporated by reference herein. To assure good connection between the connected tubulars, the tubulars and the connections may be secured by welds, bonds, or adhesives. Examples are provided in Patent/Application Nos. US2004070199, U.S. Pat. Nos. 6,719,186, 5,984,370, 5,779,276, 5,584,512, 5,566,986, 5,566,984, 9,599,257, 9,909,695, WO2014/164862, WO2019/041016, the entire contents of which are hereby incorporated by reference herein.

Despite advancements in pipeline technology, there remains a need for effective and efficient techniques for sealing pipelines, and that such techniques allow for ease of manufacture, assembly, and operation.

SUMMARY

In at least one aspect, the disclosure relates to a lockable pipeline seal for a pipeline. The pipeline comprises pipeline pipes and a pipeline sleeve. The lockable pipeline seal comprises a ring-shaped body having a head along a first ring end of the ring-shaped body and a tail along a second ring end of the ring-shaped body with a body portion between the head and the tail. The ring-shaped body having an outer surface and an inner surface along a periphery of the ring-shaped body. A deflection surface and a base surface are defined along the outer surface. The deflection surface is at an angle to a horizontal axis of the ring-shaped body. A recessed grip is defined along the inner surface. The ring-shaped body is compressible such that, when the ring-shaped body is installed between the pipeline sleeve and the pipeline pipe, the deflection surface is urged against the pipeline pipe and the recessed grip grippingly engages the pipeline sleeve whereby a locked seal is formed between the pipeline sleeve and the pipeline pipe.

The lockable pipeline seal may have one or more of the following features: The tail has a tapered tip. The tapered tip has a tapered surface along the inner surface and, when the ring-shaped body is installed between the pipeline sleeve and the pipeline pipes, the tapered tip is in non-contact with the pipeline pipes and the pipeline sleeve. The tail has a curved tail shoulder along the inner surface between the tapered surface and the body portion and wherein the tail has a grip tip defined along the curved tail shoulder and the tapered surface. The when the ring-shaped body is installed between the pipeline sleeve and the pipeline pipe, the tail rotates about an end of the pipeline sleeve. The ring-shaped body has at least one of curved edges and sharp edges about the periphery. The head has a head portion along the inner surface. When the ring-shaped body is installed between the pipeline sleeve and the pipeline pipes and compressed therein, at least one of the head and the tail elongates. The outer surface is wavy. The recessed grip is defined along a curved tail shoulder of the tail, a gripping surface of the body portion, and a curved head shoulder of the head.

In another aspect, the disclosure relates to a pipeline sleeve for sealing pipeline pipes of a pipeline. The pipeline sleeve comprises a tubular sleeve body insertable into the pipeline pipes; lockable pipeline seals positioned on the tubular sleeve body. Each of the lockable pipeline seals comprises a ring-shaped body having a head along a first ring end of the ring-shaped body and a tail along a second ring end of the ring-shaped body with a body portion between the head and the tail. The ring-shaped body has an outer surface and an inner surface along a periphery of the ring-shaped body. A deflection surface and a base surface are defined along the outer surface. The deflection surface is at an angle to a horizontal axis of the ring-shaped body. A recessed grip is defined along the inner surface. The ring-shaped body is compressible such that, when the ring-shaped body is installed between the pipeline sleeve and the pipeline pipe, the deflection surface is urged against the pipeline pipe and the recessed grip grippingly engages the pipeline sleeve whereby a locked seal is formed between the pipeline sleeve and the pipeline pipe.

The pipeline sleeve may have one or more of the following features: The pipeline sleeve further comprises a sleeve lining along an inner surface of the tubular sleeve body. The tubular sleeve body has recessed sleeve shoulders with a raised central portion therebetween. Each of the recessed sleeve shoulders comprises a rim and a recess. The recessed grip grippingly engages the rim. The recess receivably engages the head. The tail extends from an end of the tubular sleeve body.

In yet another aspect, the disclosure relates to a sealed pipeline connection comprising pipeline pipes with a fluid passage therethrough, a pipeline sleeve positioned in the fluid passage, and lockable pipeline seals positioned at each end of the pipeline sleeve. A first end of a first of the pipeline pipes is positioned adjacent a second end of a second of the pipeline pipes. The pipeline sleeve is positioned in the fluid passage. The pipeline sleeve extends into the first end of the first of the pipeline pipes and the second end of the second of the pipeline pipes. Each of the lockable pipeline seals comprises a ring-shaped body having a head along a first ring end of the ring-shaped body and a tail along a second ring end of the ring-shaped body with a body portion between the head and the tail. The ring-shaped body has an outer surface and an inner surface along a periphery of the ring-shaped body. A deflection surface and a base surface are defined along the outer surface. The deflection surface is at an angle to a horizontal axis of the ring-shaped body. A recessed grip is defined along the inner surface. The ring-shaped body is compressible such that, when the ring-shaped body is installed between the pipeline sleeve and the pipeline pipe, the deflection surface is urged against the pipeline pipe and the recessed grip grippingly engages the pipeline sleeve whereby a locked seal is formed between the pipeline sleeve and the pipeline pipe.

The sealed pipeline connection may have one or more of the following features: When compressed fluid passes through the fluid passage, the ring-shaped body is compressed against the pipeline pipes. When compressed fluid passes through the fluid passage, the ring-shaped body is compressed against the pipeline sleeve. The first end of the first of the pipeline pipes is secured to the second end of the second of the pipeline pipes by a weld.

In yet another aspect, the disclosure relates to a method of making a sealed pipeline. The method comprises: forming a pipeline sleeve by installing a lockable pipeline seal onto each end of the pipeline sleeve. Each of the lockable pipeline seals comprises a ring-shaped member having a head, a tail, and a body portion therebetween. The lockable pipeline seal has an inner surface and an outer surface. The outer surface comprises an angled deflection surface along the tail and the inner surface comprising a grip. The method further comprises: installing a first end of the pipeline sleeve into a first end of a first of the pipeline pipes and installing a second end of a second of the pipeline pipes onto a second end of the pipeline sleeve; and forming a sealed pipeline connection between the pipeline sleeve and the first and second of the pipeline pipes by urging the angled deflection surface of the lockable pipeline seals against the pipeline pipe and the gripping the grip about the pipeline sleeve.

The method may also have one or more of the following features: The method further comprises, during the forming, maintaining a non-contact portion of the lockable pipeline seals in non-contact with the pipeline pipes and the pipeline sleeve; locking the lockable pipeline seals into sealing engagement by allowing the lockable pipeline seals to flow under compression such that the lockable pipeline seals conform to a shape of the pipeline pipes and the pipeline sleeve; applying a liner to the pipeline sleeve and/or the pipeline pipes; forming a seal between each of the lockable pipeline seal and the liner the pipeline sleeve and/or the pipeline pipes; and securing the pipeline pipes together.

Finally in another aspect, the disclosure relates to a method of sealing a pipeline. The method comprises forming a pipeline connection between a pair of pipeline pipes and a pipeline sleeve by positioning a first sleeve end of the pipeline sleeve with a lockable pipeline seal thereon into a first pipe end of a first of the pair of pipeline pipes; positioning a second sleeve end of the pipeline sleeve with the lockable pipeline seal thereon into a second pipe end of a second of the pair of pipeline pipes; and, with the pipeline sleeve positioned therein, securing the first pipe end of the first of the pair of pipeline pipes to the second pipe end of the second of the pair of pipeline pipes. The method further comprises forming a fluid tight seal about the pipeline connection by: placing a contact surface of the lockable pipeline seal into contact with the pipeline pipe and the pipeline sleeve while maintaining a non-contact portion of the lockable pipeline seal in non-contact with the pipeline pipe and the pipeline sleeve; and locking the fluid tight seal by placing the lockable pipeline seal under compression such that the contact surfaces are urged against the pipeline pipe and the pipeline sleeve and the non-contact portion is free to flow about the pipeline sleeve and the pipeline pipe.

In at least one aspect, the disclosure relates to a lockable pipeline seal, comprising: a seal body having a head and a tail, with a body therebetween. In another aspect, the disclosure relates to a pipeline sleeve, comprising: a sleeve body, lockable pipeline seals, and a sleeve lining. In yet another aspect, the disclosure relates to a pipeline connection comprising a pair of pipeline pipes with a pipeline sleeve and lockable pipeline seals therein, the pipeline sleeve extending through adjacent ends of the pair of pipeline pipes. The disclosure also relates to a lockable pipeline seal, a pipeline sleeve, a pipeline connection, and a pipeline; a method of making a pipeline sleeve, a pipeline connection, and/or a pipeline; and method of sealing a pipeline, as described herein.

This Summary is not intended to be limiting and should be read in light of the entire disclosure including text, claims and figures herein.

BRIEF DESCRIPTION OF THE DRAWINGS

So that the above recited features and advantages of the present disclosure can be understood in detail, a more particular description of the disclosure, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIG. 13A is a plan view depicting the lockable pipeline seal of FIG. 9B.

FIG. 13B is a cross-sectional view depicting a portion of the lockable pipeline seal of FIG. 9B overlaid onto the lockable pipeline seal of FIG. 10B.

FIG. 15A is a cross-sectional view depicting a portion of the pipeline with the lockable pipeline seal of FIG. 14B in the installed position therein.

FIG. 15B is a cross-sectional view depicting the lockable pipeline seal of FIG. 15A.

FIGS. 19A-19D are schematic diagrams depicting stages of assembly of the pipeline connection with the lockable pipeline seal of FIG. 5B therein.

FIGS. 20A-20F are schematic diagrams depicting stages of assembly and operation of the pipeline connection with the lockable pipeline seal of FIG. 12B therein.

FIG. 21A is a flow chart depicting a method of making a sealed pipeline.

FIG. 21B is a flow chart depicting a method of sealing a pipeline.

DETAILED DESCRIPTION

Figure 1:
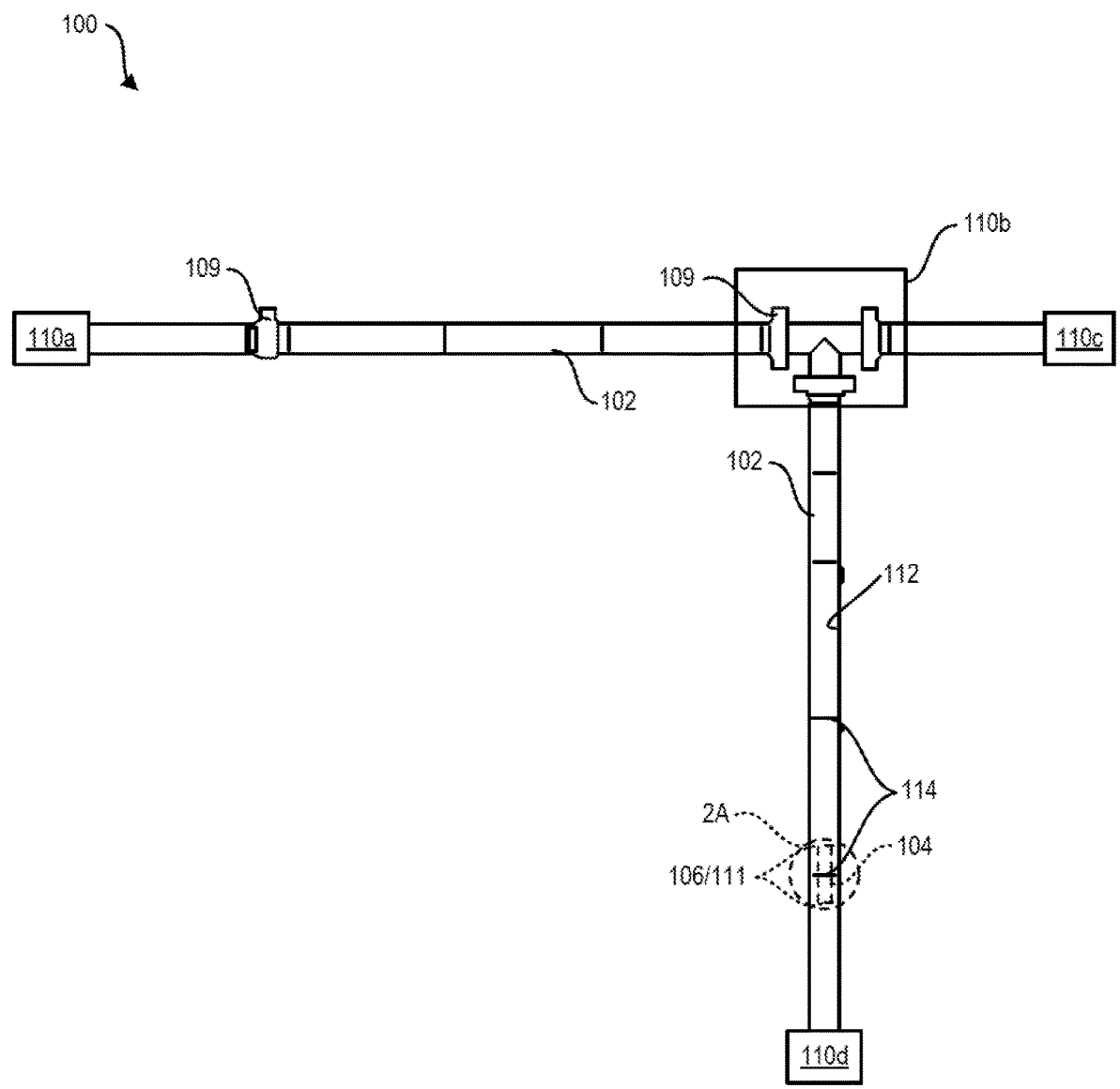
FIG. 1 is a schematic diagram depicting a pipeline comprising pipeline pipes, pipeline sleeves, and lockable pipeline seals.

The description that follows includes exemplary apparatus, methods, techniques, and/or instruction sequences that embody techniques of the present subject matter. However, it is understood that the described embodiments may be practiced without these specific details.

The present disclosure relates to a pipeline with one or more sealed pipeline connections. The sealed pipeline connection comprises an adjacent pair of pipeline pipes, a pipeline sleeve, and lockable pipeline seals. The pipeline sleeve is positioned within the adjacent pair of the pipeline pipes. The lockable pipeline seals are positioned on opposite ends of the pipeline sleeve. The lockable pipeline seals have contact surfaces engageable with the pipeline sleeve and the pipeline pipes to form one or more seals therewith, such as a contact seal along contact surfaces, a grip seal along a grip surface, an installation seal when installed into the pipeline pipes, a deflection seal along portions of the lockable pipeline seal that deflect upon installation, and a lock seal when the lockable pipeline seal is installed and then placed under compression (e.g., pressure).

The pipeline seal may be used to prevent passage of fluid between the pipeline sleeve and the pipeline pipes. The lockable pipeline seal may be formed of various materials and/or shapes to allow the lockable pipeline seals to energize about the pipeline pipes and the pipeline sleeve, and fill the spaces therebetween. The lockable pipeline seal may change shape and/or dimension by compressing, flexing, deforming, deflecting, gripping, flowing, and/or otherwise molding as needed to engage the pipeline pipes and the pipeline sleeves and/or to fill spaces, and to form the pipeline seal about the pipeline connection. This molding may be used, for example, to allow for looser tolerances between the pipeline pipes and the sleeves, to provide an interference fit for assembly, and/or to allow the lockable pipeline seals to act as a gasket to provide positive sealing with the pipeline sleeve and the pipeline pipes.

The lockable pipeline seals may have redundant sealing surfaces (e.g., primary and secondary sealing surfaces) to assure tight sealing along the pipeline pipe. The lockable pipeline seal may also have features, such as a flexible tail and a rounded head with a grip surface defined therebetween engageable with the pipeline sleeve to grip portions thereof to assure the pipeline seal is secure. The pipeline and one or more of its components (e.g., the sealed pipeline connection, the pipeline sleeve, the moldable/locking pipeline seals, etc.) may also be provided with one or more of the following capabilities, among others: ease of manufacture, ease of assembly, efficient operation, lower assembly cost, cost effective assembly and/or use, reinforced sealing, and operability with existing systems and/or equipment, dimensions that can be tailored to fit various configurations, prevention of leakage and/or corrosion, adjustability for various tolerances, shaped to mold to and/or sealingly engage surfaces of the pipeline (e.g., the pipeline pipes, the pipeline sleeve) etc.

FIG. 1 is a schematic diagram depicting a pipeline 100 comprising pipeline pipes 102, pipeline sleeves 104, and lockable pipeline seals 106. This pipeline 100 is an example of a pipeline system including facilities 110a-d with the pipeline pipes 102 extending therebetween. In the example shown, the facilities 110a-d include a production facility 110a, a beneficiation facility 110b, a market 110c, and a tailings disposal 110d. The pipeline pipes 102 extend from the production facility 110a, through the beneficiation facility 110b, and to the market 110c. A portion of the pipeline 100 branches off at the beneficiation facility 110b and extends to the tailings disposal 110d. Supports 109 may optionally be provided along the pipeline 100 to support the pipeline pipes 102. A passage 112 extends through each of the pipeline pipes 102 to define a pathway for the passage of fluids (e.g., oil, gas, water, etc.) between the facilities 110a-d.

The pipeline 100 includes a series of the pipeline pipes 102 connected together end to end in series to form the pipeline 100. A pipeline connection 114 is formed between each adjacent pair of the pipeline pipes 102. The adjacent pair of the pipeline pipes 102 may be joined by various means capable of securing the pipes together. The pipeline connection 114 may be formed, for example, by attaching a connector (such as an external joint or an internal sleeve) across the adjacent pair of the pipeline pipes 102, by applying a weld to ends of the adjacent pairs of the pipeline pipes 102, and/or by threading ends of the adjacent pairs of the pipeline pipes 102 together. Examples of techniques for connecting pipes or other tubulars are described in the patent/application(s) previously incorporated by reference herein.

The pipeline pipes 102 may be provided with various connectors, such as the pipeline sleeves 104, therein. The pipeline sleeves 104 may be positioned along the pipeline connection 114 between the adjacent pairs of the pipeline pipes 102. The pipeline sleeves 104 are sealingly positioned within the adjacent pair of the pipeline pipes 102. In this example, the pipeline sleeves 104 are tubular members inserted into the ends of the adjacent pairs of the pipeline pipes 102.

The pipeline sleeves 104 may be provided with the lockable pipeline seals 106 to form a pipeline seal 111 about the pipeline connection 114 and/or between the pipeline sleeve 104 (and or its portions) and one or more of the pipeline pipes 102 as described further herein. The pipeline 100, the pipeline pipes 102, and/or the pipeline sleeves 104 may be provided with various features to facilitate forming the pipeline connection 114 and/or the seals as described further herein.

The pipeline 100 may be a continuous, monolithic piping system or include individual, connected sections of the pipeline pipes 102. It will be appreciated that different configurations of the pipeline 100 and its components may be used. While several examples of configurations that may be used are described, these are not intended to be limiting of the features of the disclosed pipeline connection 114, the pipeline sleeves 104 and/or the lockable pipeline seals 106 described herein.

Figure 2A:
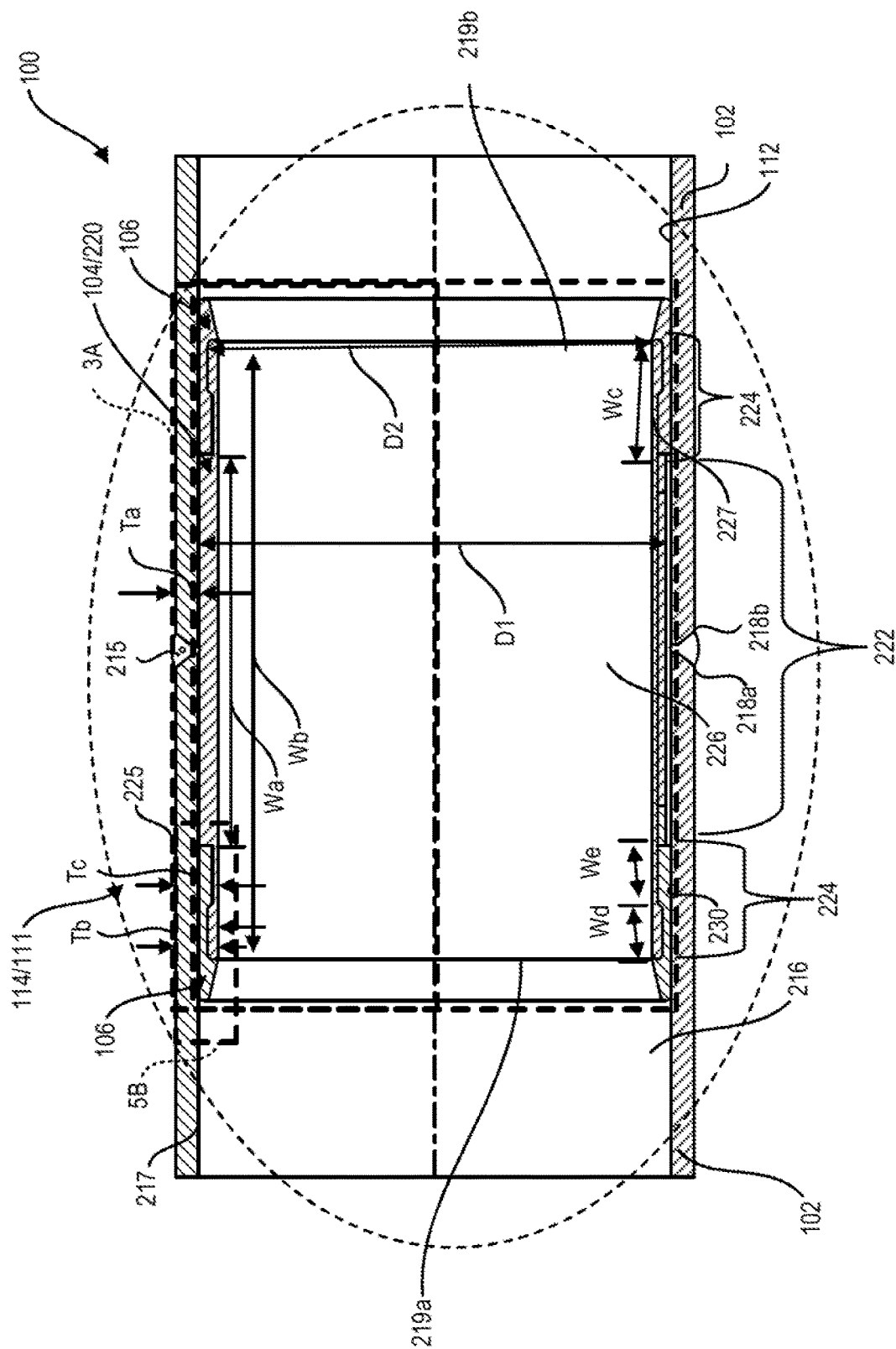
FIG. 2A is a longitudinal, cross-sectional view depicting a portion 2A of the pipeline of FIG. 1 with a pipeline connection.
Figure 2B:
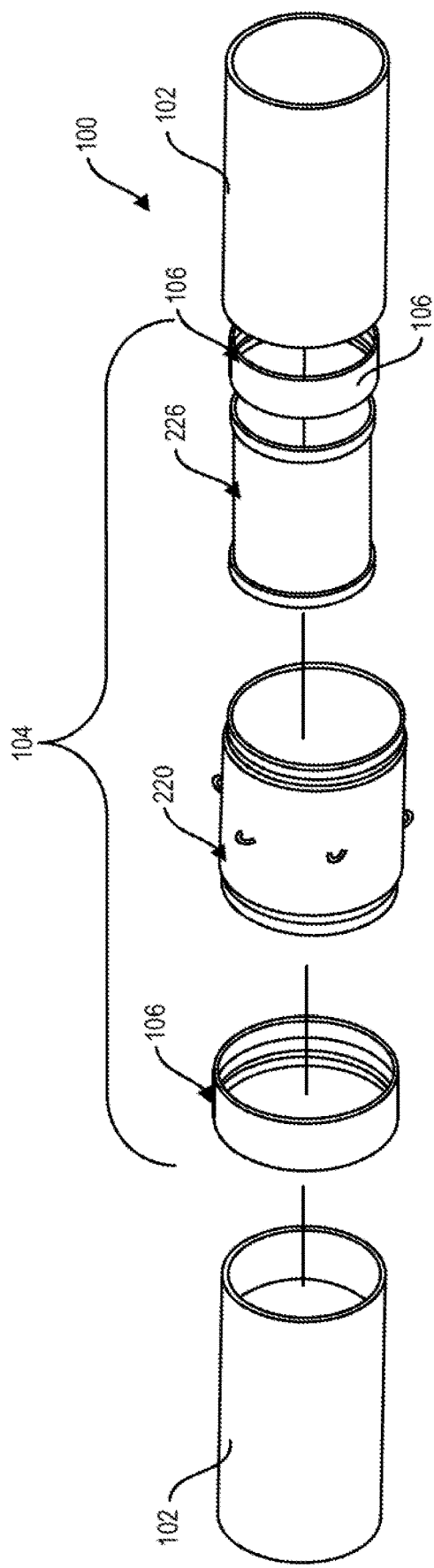
FIG. 2B is an exploded view depicting the portion of the pipeline of FIG. 2A.
Figure 2C:
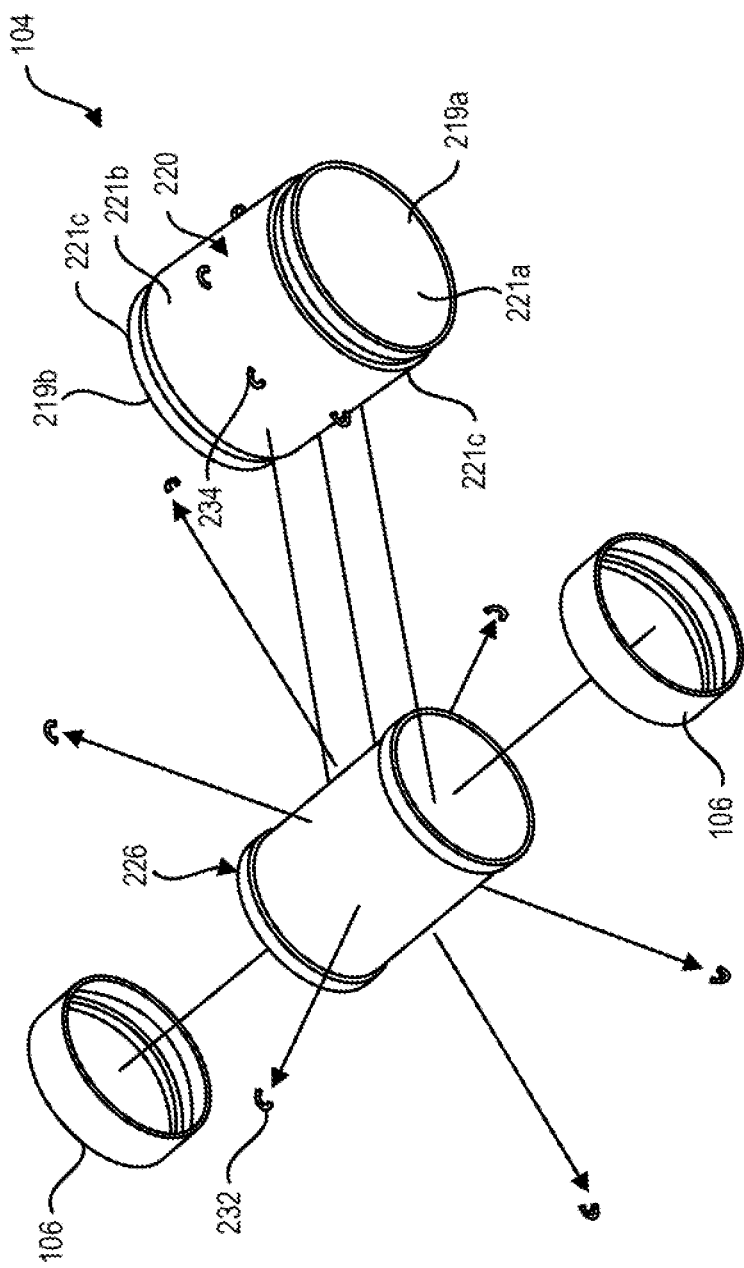
FIG. 2C is an exploded view depicting the pipeline sleeve.

FIGS. 2A-2C show various views of the pipeline connection 114 and the pipeline sleeve 104 in greater detail. FIG. 2A is a longitudinal, cross-sectional view depicting a portion 2A of the pipeline 100 of FIG. 1. FIG. 2B is an exploded view depicting the portion of the pipeline 100 of FIG. 2A. FIG. 2C is an exploded view depicting the pipeline sleeve 104.

FIG. 2A depicts the pipeline connection 114 formed by the pairs of pipeline pipes 102 and the pipeline sleeve 104 with the lockable pipeline seals 106. The pair of pipeline pipes 102 are joined end to end with the pipeline sleeve 104 therein to form the pipeline connection 114 and pipeline seal 111 therebetween.

The pipeline pipes 102 are metal tubulars having the passage 112 therethrough. Each of the pipeline pipes 102 are shown as having first and second pipeline ends 218a,b positioned adjacent to each other. Each of the pipeline pipes 102 has the first pipeline end 218a and the second pipeline end 218b at each end thereof. In the example shown the first and second pipeline ends 218a,b are beveled.

When axially aligned for mating, the first pipeline end 218a of one of the pipeline pipes 102 is connected to the second pipeline end 218b of another of the pipeline pipes 102. The pipeline ends 218a,b are joined by a connection means 215 (e.g., the weld) therebetween. In this example, the pipeline ends 218a,b of each of the pair of pipeline pipes 102 are in abutting engagement with a full penetration weld securing the abutting pipeline ends 218a,b together. While the pipeline pipes 102 are shown in abutting engagement, the pipeline pipes 102 may optionally be connected using butt strap or other methods, such as where the ends 218a,b of the pipeline pipes 102 overlap and are secured together by welding or other means.

The pipeline pipes 102 have a pipe lining 216 along their inner surface 217. The pipe lining 216 may be positioned inside each of the pipeline pipes 102 for protection thereof. The pipe lining 216 may be made of a wear resistant material, such as a liquid epoxy, fusion bonded epoxy, polyurethane, or any other material that provides a protective layer. This material may be applied (e.g., sprayed) to the pipeline pipes 102 to form a protective layer thereon. The pipe lining 216 may be a thin layer (e.g., substantially thinner than a thickness of the pipeline pipes 102). The pipe lining 216 may extend over only a portion of the inner surface 217 of the pipeline pipes 102. A remaining portion of the inner surface 217 near the pipeline ends 218a,b may have no pipe lining 216 to allow the lockable pipeline seals 106 to engage the inner surface 217 of the pipeline pipe 102. Examples of techniques for lining pipes are described in one or more of the patent/applications incorporated by reference herein.

Referring to FIGS. 2A-2C, the pipeline sleeve 104 may be a tubular member axially aligned with the pipeline pipes 102 and positioned therein. An outer surface 221b of the pipeline sleeve 104 is positioned along the inner surface 217 of the pipeline pipes 102. The pipeline sleeve 104 may be shaped to fit snugly within the pipeline pipes 102 with the passage 112 extending therethrough to permit substantially uninterrupted flow of fluid through the pipeline sleeve 104 and the pipeline pipes 102.

The pipeline sleeve 104 has a first sleeve end 219a that extends into the first pipeline end 218a and a second sleeve end 219b that extends into the second pipeline end 218b of the pair of pipeline pipes 102 such that the pipeline sleeve 104 extends across the pipeline connection 114. The pipeline sleeve 104 may be partially or fully pre-assembled for insertion into and/or use with the pipeline pipes 102 as described further herein.

The pipeline sleeve 104 has a metal, tubular sleeve body 220 with a sleeve lining 226 therein. The sleeve body 220 has a smooth inner surface 221a shaped to allow fluid to freely flow therethrough. The outer surface 221b of the metal sleeve body 220 is stepped to define a raised central portion 222 and recessed sleeve shoulders 224, both with the same inner diameter to define the smooth inner surface 221a. The sleeve shoulders 224 have an outer diameter D2 less than an outer diameter D1 of the raised central portion 222 with a sleeve step 225 defined therebetween.

The recessed sleeve shoulders 224 are positioned adjacent the sleeve steps 225 at each sleeve end 219a,b of the sleeve body 220. Raised rims 221c are positioned along the recessed sleeve shoulders 224 to define a recess 227 between the rims 221c and the raised central portion 222. The pipeline sleeve 104 is shaped to support the lockable pipeline seals 106 about the pipeline pipes 102 and the pipeline connection 114 to form a seal therewith. When the pipeline sleeve 220 is positioned in the pipeline pipes 102, a seal space 230 is defined therebetween to receive the lockable pipeline seal 106 therein as is described further herein.

The sleeve body 220 may be have various shapes and dimensions to permit the sleeve body 220 to support the pipeline pipes 102, the pipeline connection 114, and the lockable pipeline seals 106 for operation therewith. For example, the sleeve body 220 may have a width Wb of from about 10.20 to about 12.70 cm and the raised central portion 222 has a width Wa of from about 14.60 to about 20.30 cm. In another example, the raised central portion 222 may have a thickness Ta of from about 6 mm to about 9 mm, the rims 221c may have a thickness Tb of from about 2.4 mm to about 6.4 mm, and the recess 227 may have a thickness Tc of from about 1.2 mm to about 3.2 mm.

In yet another example, each of the recessed sleeve shoulders 224 may extend between the raised central portion 222 and the first or second sleeve ends 219a,b of the sleeve body 220, and may have a width We of from about 2.30 to about 3.80 cm. In yet another example, the rims 221c and the recesses 227 may each have a width Wd and We, respectively, of from about 1.15 to about 1.9 cm.

The sleeve body 220 may be provided with holes 234 therethrough centrally located and spaced radially about the raised central portion 222. A plurality of removable connection spacers 232 are positionable in the radially spaced holes 234 along the outer surface 221b of the sleeve body 220. Each of the connection spacers 232 are disposed into the holes 234, and extends a distance above the outer surface 221b of the sleeve body 220. The connection spacers 232 may be made of steel wire or other material capable of acting as a stop for placement of the first and second ends 218a,b of the pair of the pipeline pipes 102 during connection as is described further herein.

The pipeline sleeve 104 has the sleeve lining 226 along the inner surface 221a. The sleeve lining 226 may be a protective material capable of protecting the pipeline sleeve 104, such as such as a liquid epoxy, fusion bonded epoxy, polyurethane, or any other material that provides a relatively thin protective layer. The sleeve lining 226 may also extend around the first and second sleeve ends 219a,b of the sleeve body 220, and cover a portion of the outer surface 221b of the sleeve body 220. As shown in FIGS. 2A-2C, the sleeve lining 226 extends around the first and second sleeve ends 219a,b and covers the rims 221c.

As shown in FIG. 2A, each of the lockable pipeline seals 106 are positionable in the seal space 230 defined between the pipeline pipes 102 and the pipeline sleeve 104, with a non-contact portion of the lockable pipeline seals 106 open to the passage 112 therein. The lockable pipeline seals 106 may be positioned on each of the first sleeve end 219a and the second sleeve end 219b of the sleeve body 220 and inserted into the pipeline pipes 102 with the pipeline sleeve 104 for sealing engagement with the pipeline pipes 102 and/or the pipe lining 216 therein.

The lockable pipeline seals 106 may be made of various materials, such as a moldable material capable of sealing with the pipeline pipes 102 and the pipeline sleeve 104. The moldable material may be, for example, metal plates with o-rings or gaskets, flexible metal (e.g., thin gauge steel), an elastomeric material (e.g., fluorocarbon rubber (FKM), silicone rubber or nitrile rubber (NBR)), a membrane material (e.g., neoprene), and combinations thereof. In one example, the moldable material is ethylene propylene diene monomer (EPDM), with a 60+/−5 Shore A hardness or chloroprene (neoprene) 60+/−5 Shore A hardness. The lockable pipeline seals 106 may be included as a component of the pipeline sleeve 104 or assembled separately therefrom.

The lockable pipeline seals 106 have a shape defined to form a seal with the pipeline pipes 102 and the pipeline sleeve 104 (as well as the pipe lining 216 and the sleeve lining 226). The lockable pipeline seal 106 may change shape as it moves from an uninstalled position outside of the pipeline pipes 102, to an installed position when mounted onto the sleeve body 220 and installed into the pipeline pipes, and to a compressed (e.g., locked) position when placed under compression when installed within the pipeline pipes as is described further herein. Portions of the lockable pipeline seal 106 may engage and form contact, deflection, compressed, and/or locked seals with portions of the pipeline pipes 102 and the pipeline sleeve 104 to prevent fluid leakage therebetween as the lockable pipeline seal 106 is in the uninstalled, installed, and/or compressed positions as is also described further herein.

While this disclosure describes specific structures of the pipeline pipes 102, the pipeline connection 114, the pipeline sleeve 104, the lockable pipeline seals 106 and other features described herein, it will be appreciated that the features of these components may vary. For example, a specific shape and dimensions of the pipeline sleeve 104 and the lockable pipeline seal may vary. In another example, the pipeline sleeve 104 may be positioned in any configuration capable of extending the pipeline seal 111 across the pair of adjacent pipeline pipes, such as in an external configuration where the pipeline sleeve 104 is positioned along an outer surface of the pipeline pipes 102 with the lockable pipeline seals 106 positioned between the pipeline sleeve 104 and an outer surface of the pipeline pipes 102.

Examples of other features usable with the pipeline sleeve 104 and the lockable pipeline seals are provided in U.S. Provisional Patent Application No. 63/165,080 file on Mar. 23, 2021 and its related US Non-Provisional Patent Application No. (not yet assigned) filed on the same date as the present application, both entitled "Sealed Pipeline Connection and Raised Pipeline Sleeve, and Method of Making Same", the entire contents of which are incorporated by reference herein to the extent not inconsistent with the present disclosure.

Figure 3A:
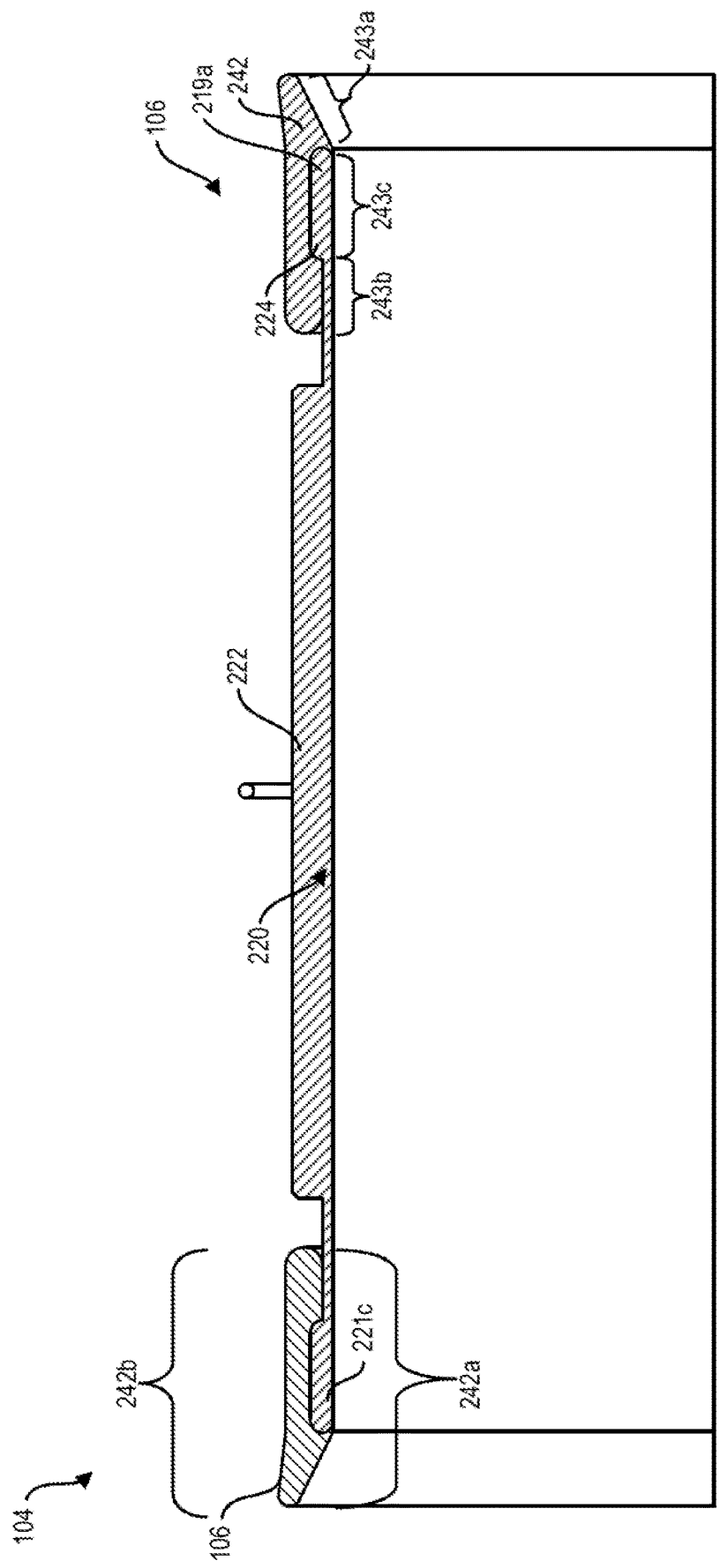
FIG. 3A is a cross-sectional view depicting a portion 3A of the pipeline sleeve of FIG. 2A with a deflectable version of the lockable pipeline seal in the uninstalled position thereon.
Figure 3B:
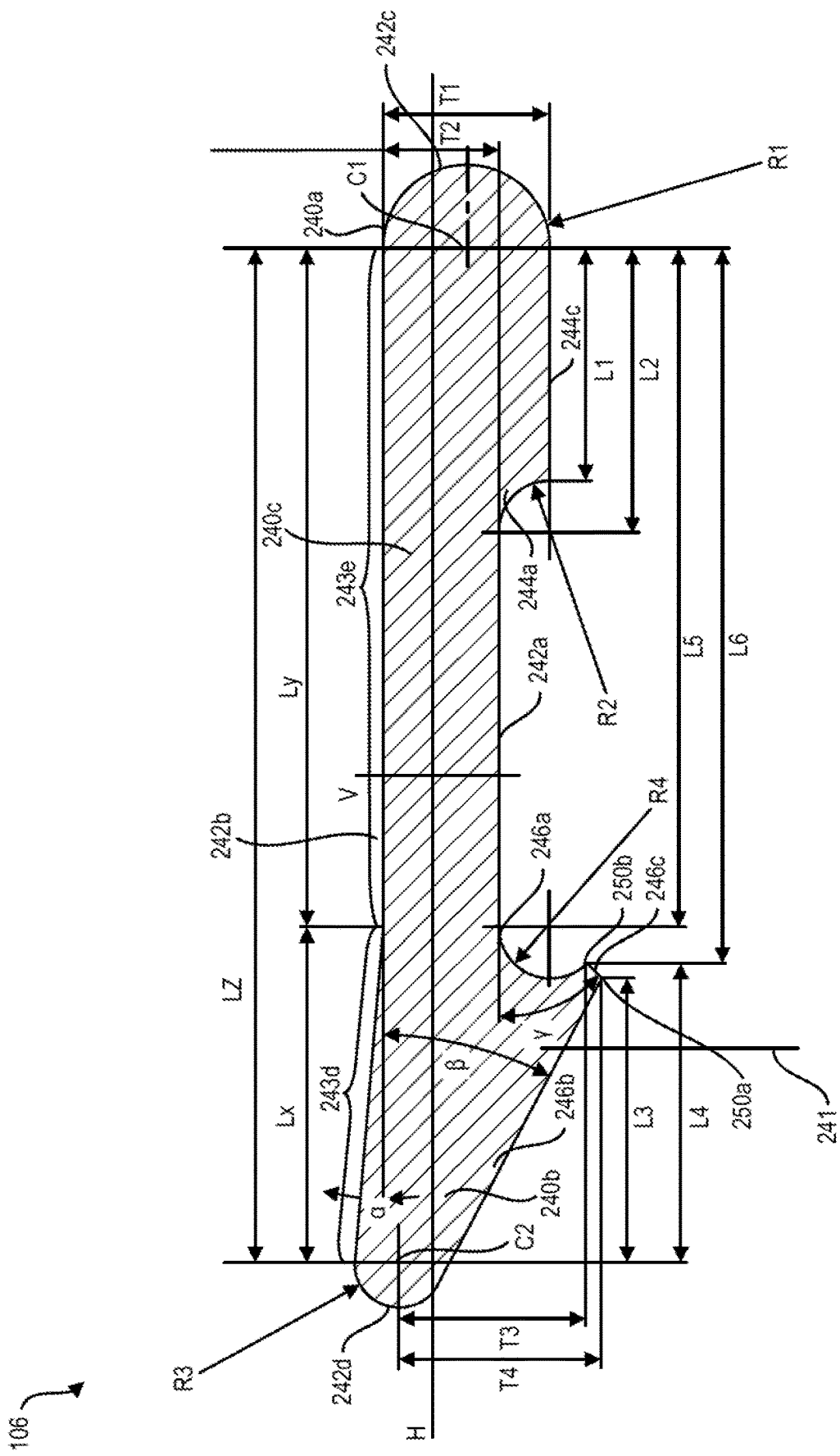
FIG. 3B is a cross-sectional view depicting the lockable pipeline seal of FIG. 3A.
Figure 4A:
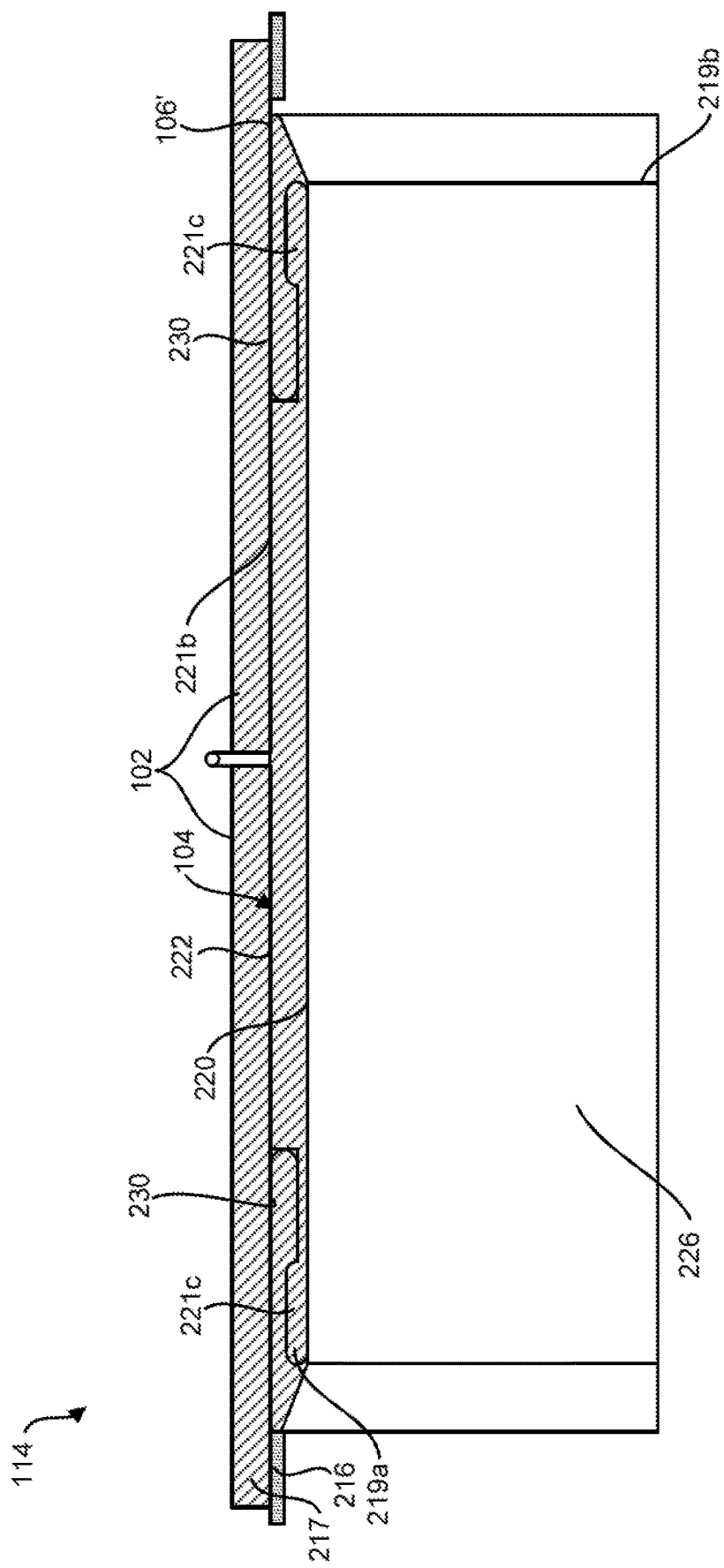
FIG. 4A is a cross-sectional view depicting a portion of the pipeline connection with the pipeline sleeve and the lockable pipeline seal in an installed position therein.
Figure 4B:
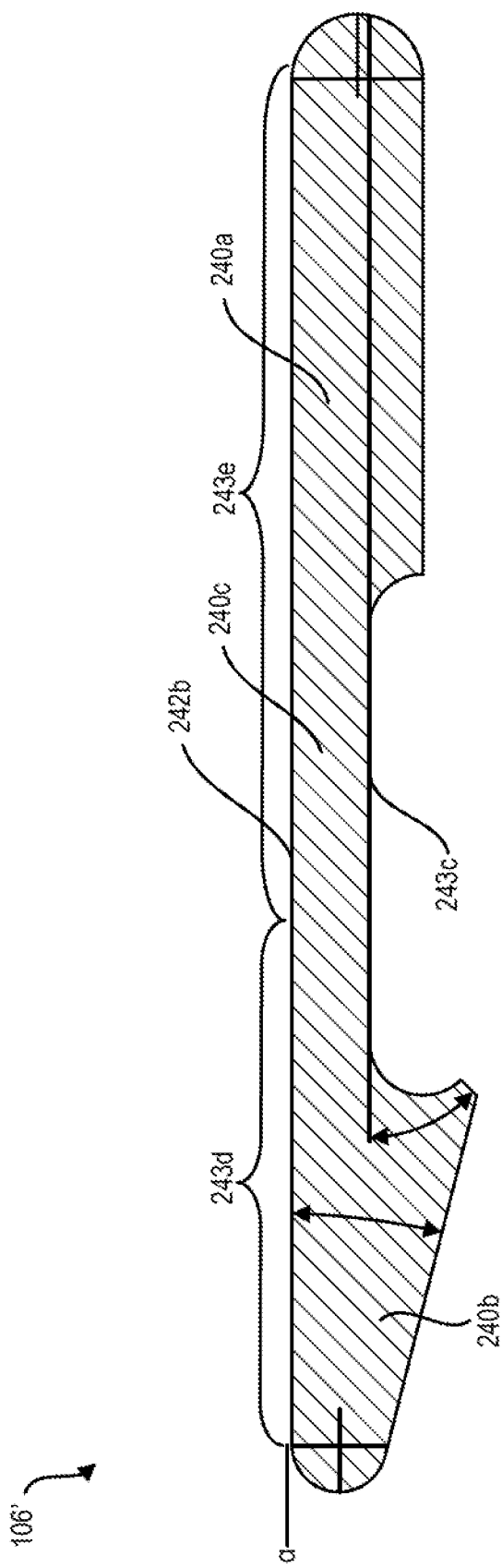
FIG. 4B is a cross-sectional view depicting the lockable pipeline seal of FIG. 3B in the installed position.

FIGS. 3A-4B show a deflectable version of the lockable pipeline seal 106 in greater detail. FIG. 3A is a cross-sectional view depicting a portion 3A of the pipeline sleeve 104 of FIG. 2A with the deflectable version of the lockable pipeline seal 106 in the uninstalled position thereon. In FIG. 3A, the pipeline sleeve 104 is shown before installation in the pipeline pipes 102. FIG. 3B is a cross-sectional view depicting the lockable pipeline seal 106 of FIG. 3A. FIG. 4A is a cross-sectional view depicting a portion of the pipeline connection 114 with the pipeline sleeve 104 and the lockable pipeline seal 106' in an installed position therein. FIG. 4B is a cross-sectional view depicting the lockable pipeline seal 106' of FIG. 3B in the installed position.

As shown in FIG. 3A, in the uninstalled position, the lockable pipeline seals 106 are positioned on each of the first and second sleeve ends 219a,b of the sleeve body 220. As shown in FIGS. 3A-3B, the lockable pipeline seals 106 each have a rounded head 240a at one end, a tapered tail 240b at another end, and an elongate body 240c therebetween. The lockable pipeline seals 106 have a head end 242c at an end of the head 240a and a tail end 242d at the end of the tail 240b. The head 240a is positioned about the sleeve shoulder 224 between the rim 221c and the raised central portion 222. Each of the tails 240b extends a distance from one of the first and second sleeve ends 219a,b of the pipeline sleeve 104. The elongate body 240c is positioned on the rims 221c which retain the lockable pipeline seals 106 in place.

The lockable pipeline seal 106 also has a peripheral surface 242 comprising an inner surface 242a and an outer surface 242b. The inner surface 242a comprises a non-contact surface 243a along the tail 240b, a recess surface 243b along the head 240a, and a gripping surface (or grip) 243c along the body portion 240c therebetween. The outer surface 242b comprises a deflection surface 243d and a base surface 243e. In the uninstalled position, the surfaces 243b-e may contact portions of the pipeline pipes 102, sleeve body 220, pipe lining 216, and/or sleeve lining 226 to form a contact seal therewith.

As shown in FIG. 3B, the outer surface 242b extends from a centerline C1 of the rounded head end 242c to a centerline C2 at the tail end 242d. The deflection surface 243d extends along the tapered tail 240b from the centerline C2 of the tail end 242d to the body portion 240c at the base surface 243e, and the base surface 243e extends along the head 240a and the elongate body 240c from the centerline C1 to the deflection surface 243d. The base surface 243e is shown as being flat, but may have other shapes (e.g., wavy, angled, etc.). The deflection surface 243e has a length Lx. The base surface 243e has a length Ly (Lx+Ly=Lz). The rounded head 240a has the head end 242c with a head outer radius R1, a curved head shoulder 244a with a head inner radius R2 and a flat head portion 244c therebetween. A body thickness T2 is defined between the inner surface 242a and the outer surface 242b along the elongate body 240c. A head thickness T1 is defined along the rounded head 240a from the outer surface 242b to the inner surface 242a. A first head length L1 is defined between a first end of the head shoulder 244a and the center C1 of the head end 242c. A second head length L2 is defined between a second end of the head shoulder 244a and the center C1 of the head end 242c.

The tail 240b has the rounded tail end 242d with a tail outer radius R3, and a curved tail shoulder 246a with a tail inner radius R4 therebetween. The tail 240b also has the deflection surface 243d on one side, and a tapered surface 246b and the curved tail shoulder 246a along the inner surface 242a. The lockable pipeline seal 606 has a horizontal (longitudinal) axis H and a vertical (radial) axis V. A tail angle β along the tapered surface 246b extends at an acute angle (e.g., from about 15 to about 40 degrees) to the horizontal axis H of the lockable pipeline seal 106 and/or to the base surface 243e along the elongate body 240c. The tapered surface 246b may include all or part of the non-contact surface 243a.

The tapered tail 240b extends from the body portion 240c and terminates at the tail end 242d. A grip tip 241 extends from the tail 240b along the tapered surface 246b and the curved tail shoulder 246a. The grip tip 241 terminates in a round surface 246c extending between the tapered surface 246b and the curved tail shoulder 246a. A round edge 250a is defined where the tapered surface 246b meets the round surface 246c. A tail angle Y along the round surface 246c extends at an acute angle (e.g., from about 15 to about 40 degrees) to a horizontal axis H of the lockable pipeline seal 106 and/or to the inner surface 242a along the elongate body 240c.

A shoulder edge 250b is defined where the round surface 246c meets the tail shoulder 246a. A length L3 and a tail thickness T4 are defined between the round edge 250a and a center C2 of the tail 240b. A length L4 and a tail thickness T3 are defined between the shoulder edge 250b and the center C2 of the tail 240b. A length L5 is defined between an end of the curved tail shoulder 246a and a center C1 of the head 240a. A length L6 is defined between the shoulder edge 250b and the center C1 of the head 240a.

The tail 240b along the deflection surface 243d extends at a flex angle α to the horizontal axis H of the lockable pipeline seal 106 and/or to base surface 243e along the elongate body 240c. The flex angle α may be an acute angle (e.g., from about 2, 5 to about 15 degrees) sufficient to urge the deflection surface 243d against the inner surface of the pipeline pipe 102 when the pipeline sleeve 104 with the lockable pipeline seals 106 is positioned into the pipeline pipe 102 as is described further herein.

The inner surface 232a along the body portion 240c may be recessed to define a gripping surface (or grip). The gripping surface 243c extends along the inner surface 242a from the round surface 246c, along the body portion 240c, and along the curved head portion 244a. The gripping surface 243c may be shaped to receivingly grip the rim 221c. The shape of the gripping surface 243c may be defined such that the gripping surface 243c tightly grips the rim 221c and applies a force to the rim 221c to create a stronger seal than the contact seal. The curved tail portion 246a and the curved head portion 244a of the gripping surface 243c engage opposite ends of the raised rims 221c. Under compression, the curved tail portion 246a and the curved head portion 244a may be urged against the opposite ends of the raised rim 221c in a gripping (e.g., pinching) action. The inner surface 242a along the body portion 240c may also be compressed against the raised rim 221c the raised rim 221c.

As shown in FIGS. 4A and 4B, once the pipeline sleeve 104 is installed into the pipeline pipes 102, the installed lockable pipeline seal 106' deflects and changes shape. When the installed lockable pipeline seal 106' is positioned between the pipeline pipes 102 and the lockable pipeline seal 106', the outer surface 242b contacts the inner surface 217 of the pipeline pipes 102 to form the contact seal therewith. When installed, the installed lockable pipeline seal 106' may mold to the inner surface of the pipeline pipes 102 and the outer surface 221b of the sleeve body 220, and fill the seal space 230 therebetween. The installed lockable pipeline seal 106' may also seal with the pipe lining 216 of the pipeline pipes 102 (FIG. 2A) and the sleeve lining 226 of the pipeline sleeve 104.

As needed, the tail 240b may deflect and the flex angle α (shown as zero degrees) may reduce so that the base surface 243e aligns with the deflection surface 243d and forms a contact seal with the pipeline pipes 102. The deflection surface 243d may deflect into a flat position in alignment with the base surface 243e and the inner surface 217. When the deflection surface 243d deflects as it is pushed against the pipeline pipes 102, a deflection seal is formed with the pipeline pipes 102. This deflection causes the tail 240b to be urged against the inner surface 217 of the pipeline pipes 102. This urging may increase strength of the deflection seal and further secure the deflection surface 243d in a sealed position against the pipeline pipes 102. Due to the deflection, the tail 240b may apply a force against the pipeline pipes 102 to create a stronger seal than the contact seal.

While specific dimensions for the lockable pipeline seal have been presented, it will be appreciated that the dimensions for specific applications may vary. For example, thicknesses (e.g., T1, T2) can be tailored to fit the pipeline sleeve (e.g., pre-existing manufactured sleeves). Table 1 below shows example dimensions for the uninstalled lockable pipeline seal 106 and the installed lockable pipeline seal 106':

TABLE 1

UNINSTALLED AND INSTALLED DIMENSIONS
OF THE LOCKABLE PIPELINE SEAL

| DIMENSION | UNINSTALLED VALUE | INSTALLED VALUE |
|---|---|---|
| L1 | 5.85 mm | 12.7 mm |
| L2 | 7.85 mm | 12.7 mm |
| L3 | 10.09 mm | 11.91 mm |
| L4 | 10.60 mm | 12.42 mm |
| L5 | 24.12 mm | 32.72 mm |
| L6 | 25.40 mm | 34.00 mm |
| Lx | 11.89 mm | 14.94 mm |
| Ly | 24.12 mm | 32.54 mm |
| Lz (Lx + Ly) | 36.01 mm | 47.48 mm |
| T1 | 5.92 mm | 4.50 mm |
| T2 | 4.10 mm | 2.69 mm |
| T3 | 6.65 mm | 4.19 mm |
| T4 | 7.17 mm | 4.70 mm |
| R1 | 2.96 mm | 2.25 mm |
| R2 | 1.82 mm | 1.82 mm |
| R3 | 1.59 mm | 1.59 mm |
| R4 | 1.82 mm | 1.82 mm |
| α | 5 degrees | 0 |
| β | 28 degrees | 13 degrees 12 min |
| γ | 45 degrees | 45 degrees |

Figure 6A:
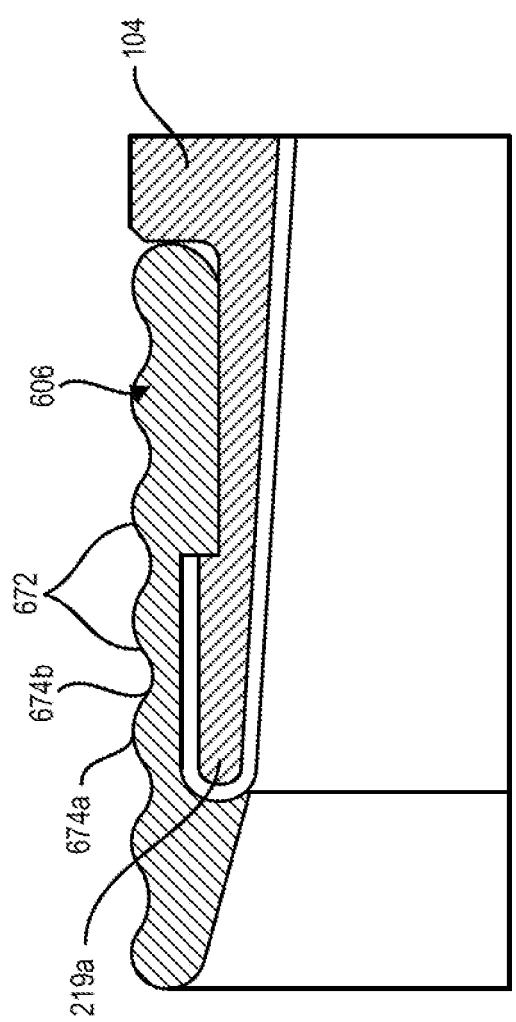
FIG. 6A is a cross-sectional view depicting a portion of the pipeline sleeve with a wavy version of the lockable pipeline seal in the uninstalled position thereon.
Figure 6B:
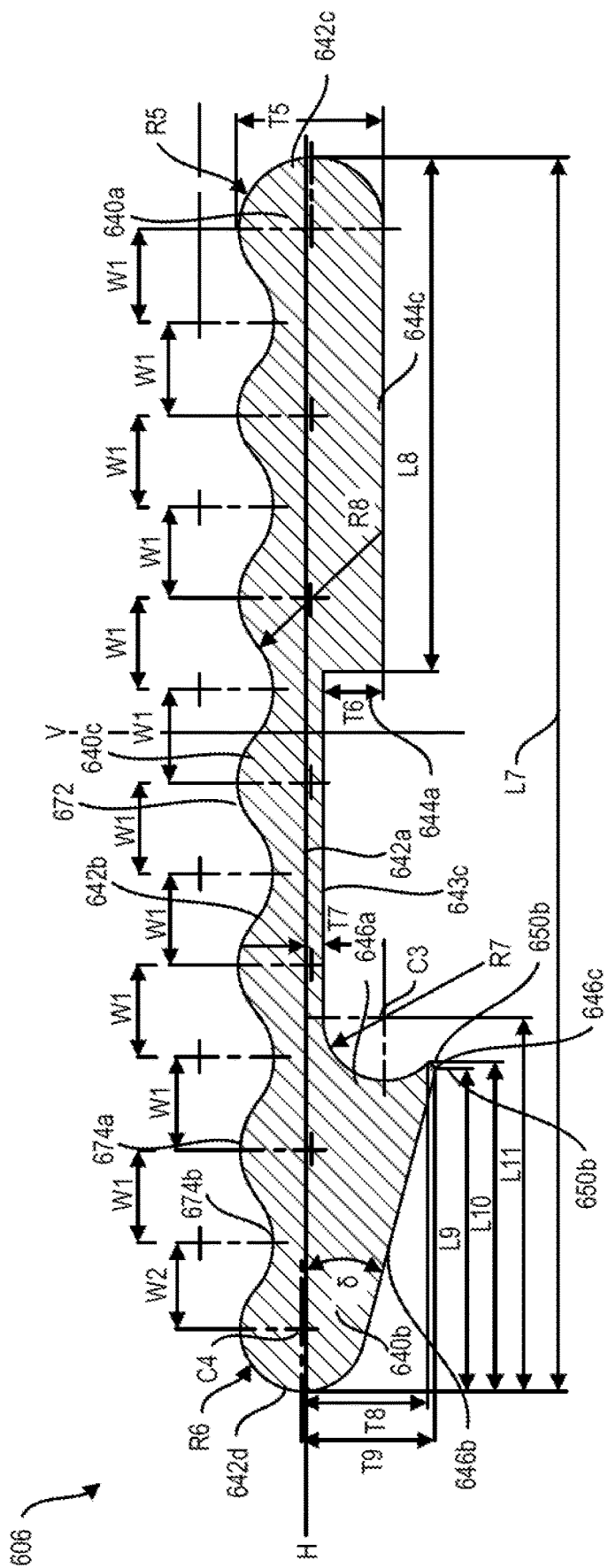
FIG. 6B is a cross-sectional view depicting the lockable pipeline seal of FIG. 6A.
Figure 7A:
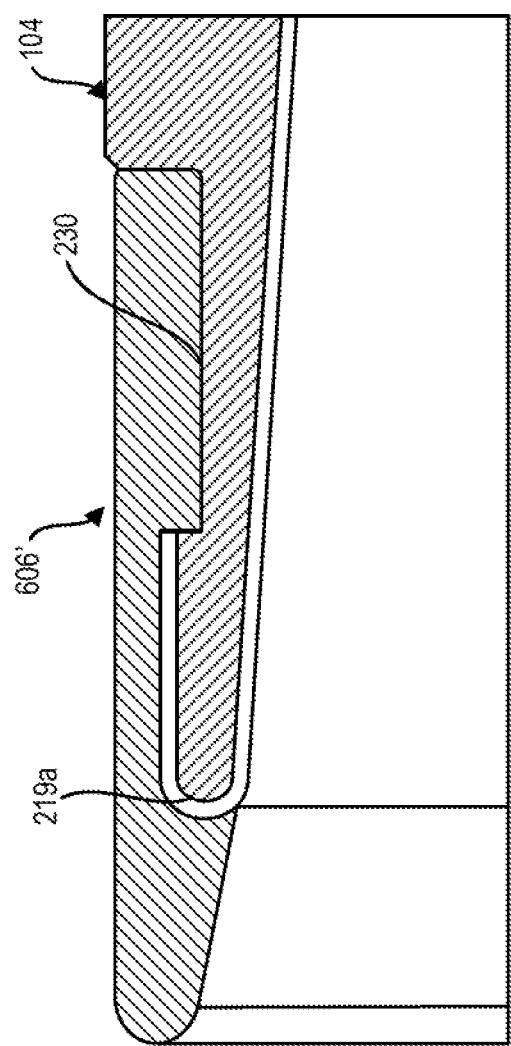
FIG. 7A is a cross-sectional view depicting a portion of the pipeline sleeve with the lockable pipeline seal in the installed position thereon.
Figure 7B:
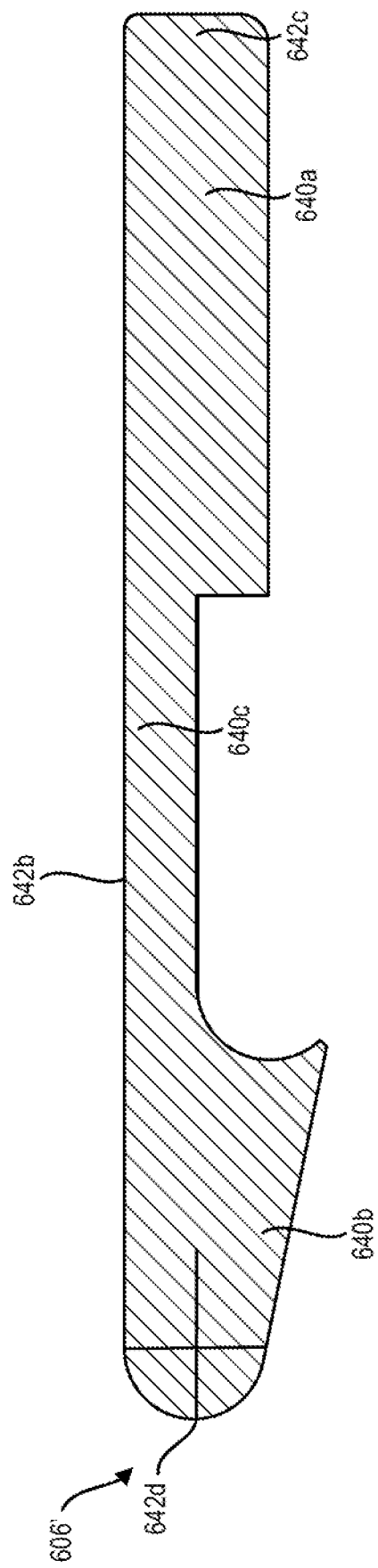
FIG. 7B is a cross-sectional view depicting the lockable pipeline seal of FIG. 7A.
Figure 9A:
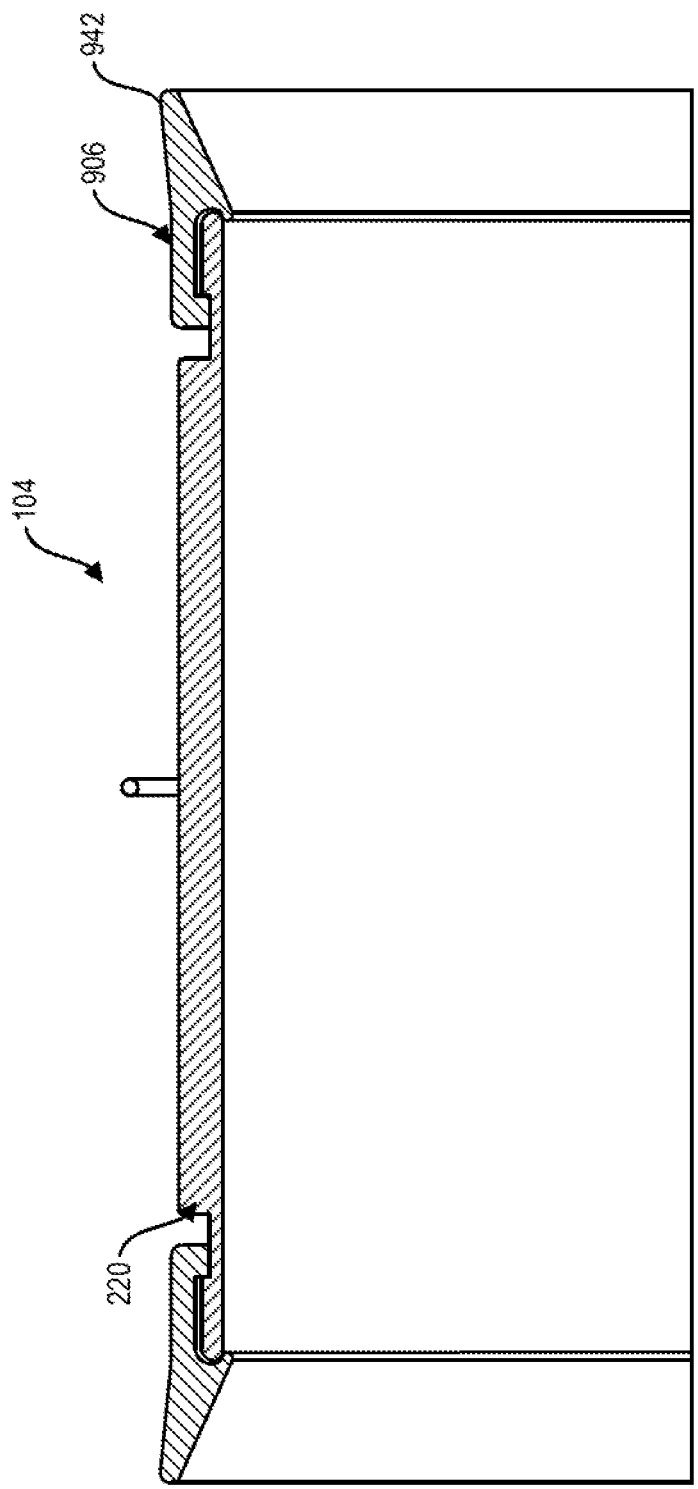
FIG. 9A is a cross-sectional view depicting the portion of the pipeline sleeve with a compressible version of the lockable pipeline seal in the uninstalled position.
Figure 9B:
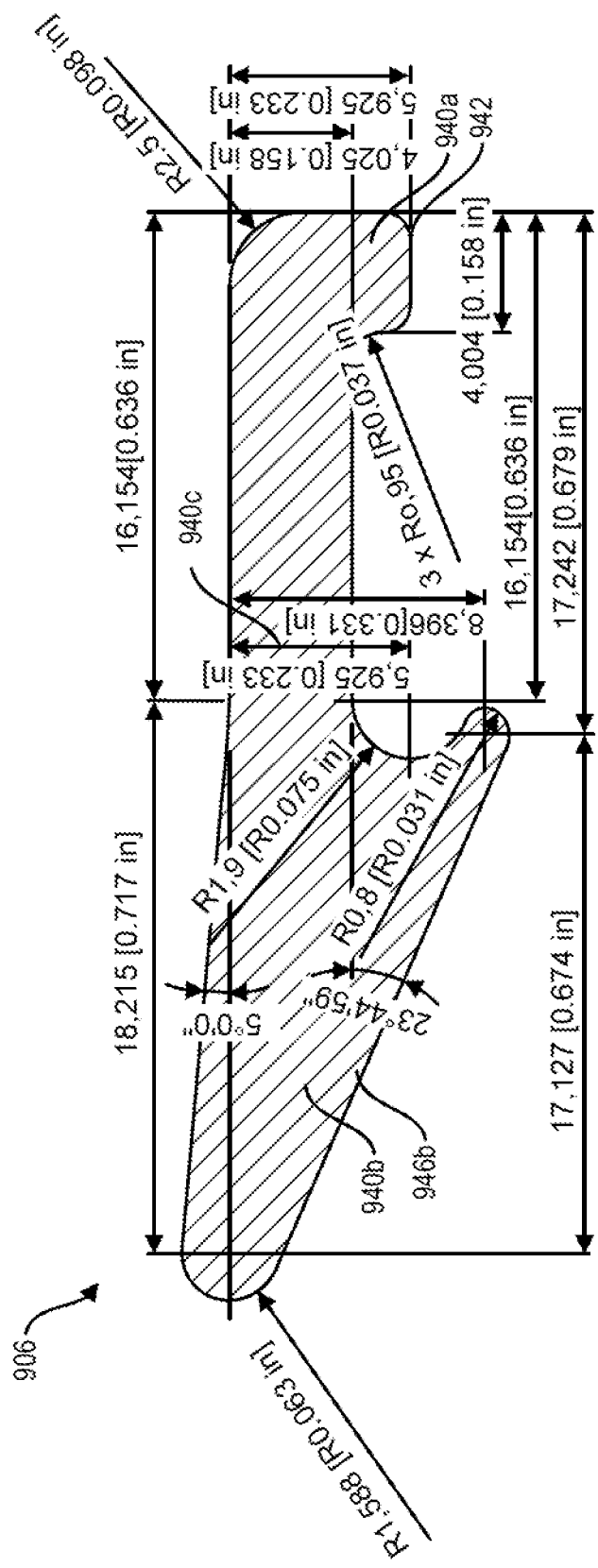
FIG. 9B is a cross-sectional view depicting the lockable pipeline seal of FIG. 9A.
Figure 10A:
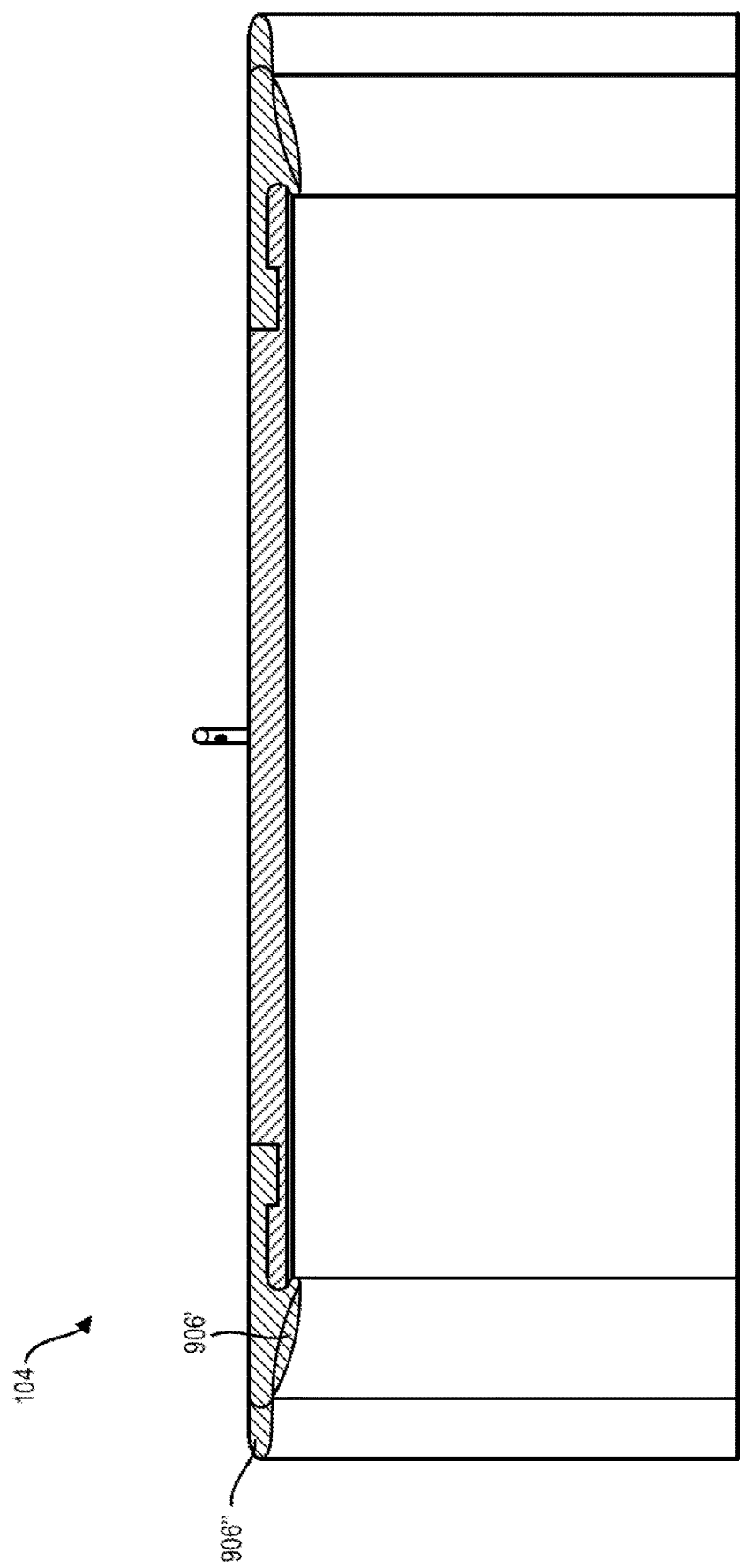
FIG. 10A is a cross-sectional view depicting the portion of the pipeline sleeve with the lockable pipeline seal of FIG. 9B in an installed and compressed position thereon.
Figure 10B:
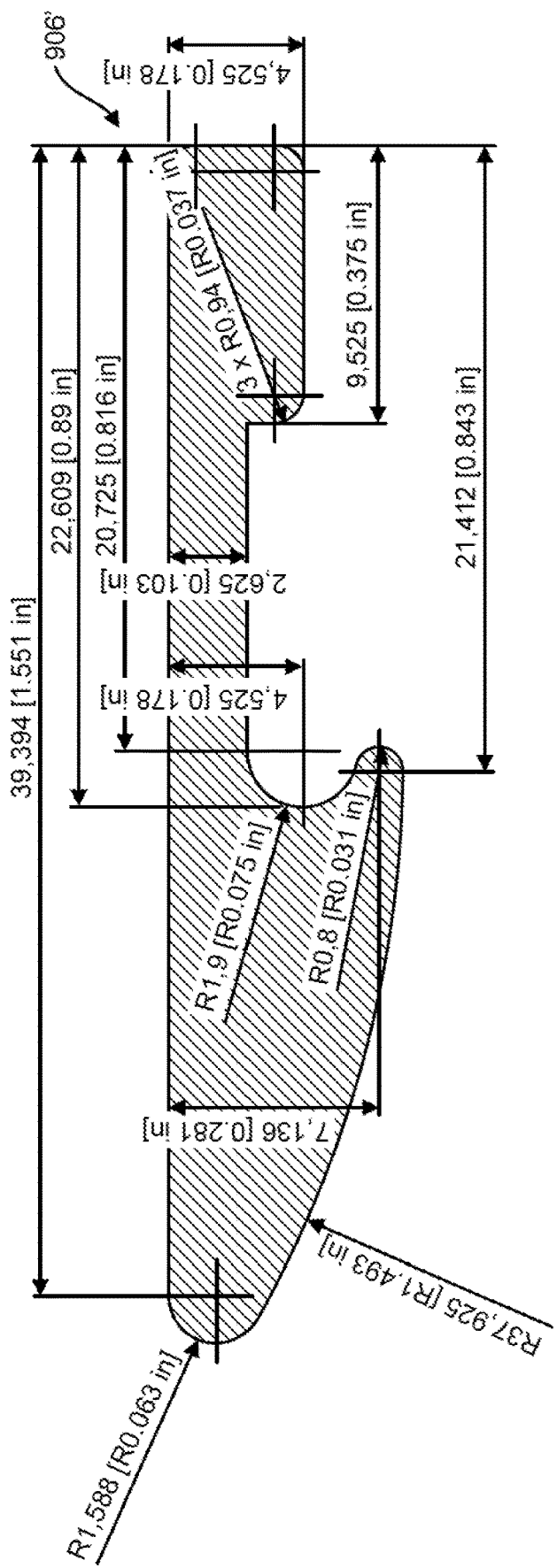
FIG. 10B is a cross-sectional view depicting the lockable pipeline seal of FIG. 9B in the installed position.
Figure 11A:
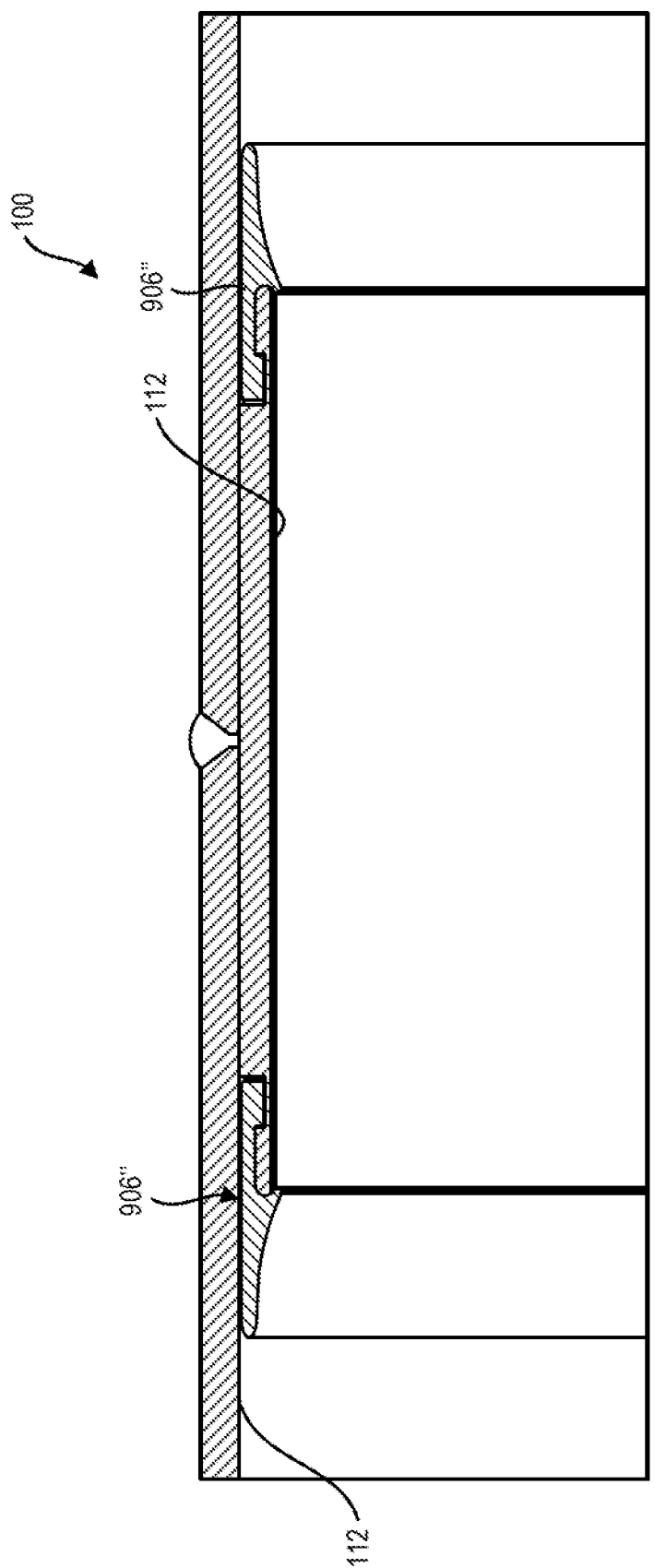
FIG. 11A is a cross-sectional view depicting a portion of the pipeline with the lockable pipeline seal of FIG. 9B in a compressed position therein.
Figure 11B:
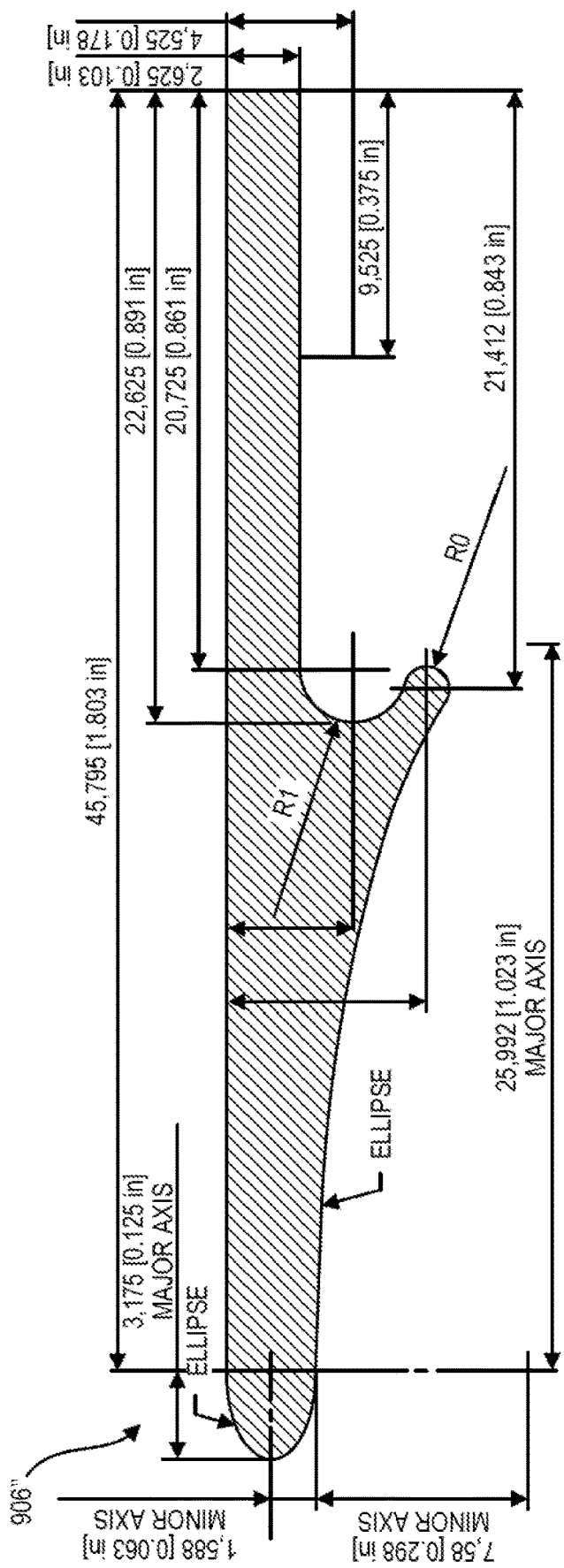
FIG. 11B is a cross-sectional view depicting the lockable pipeline seal of FIG. 11A.
Figure 14A:
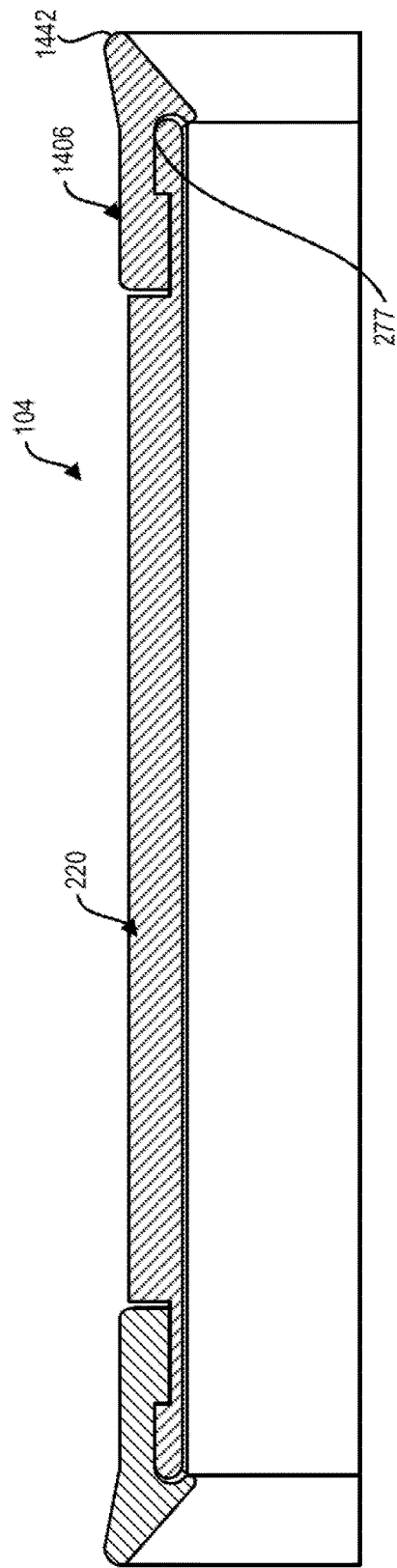
FIG. 14A is a cross-sectional view depicting a portion of the lockable pipeline sleeve with another compressible version of the lockable pipeline seal in an uninstalled position.
Figure 14B:
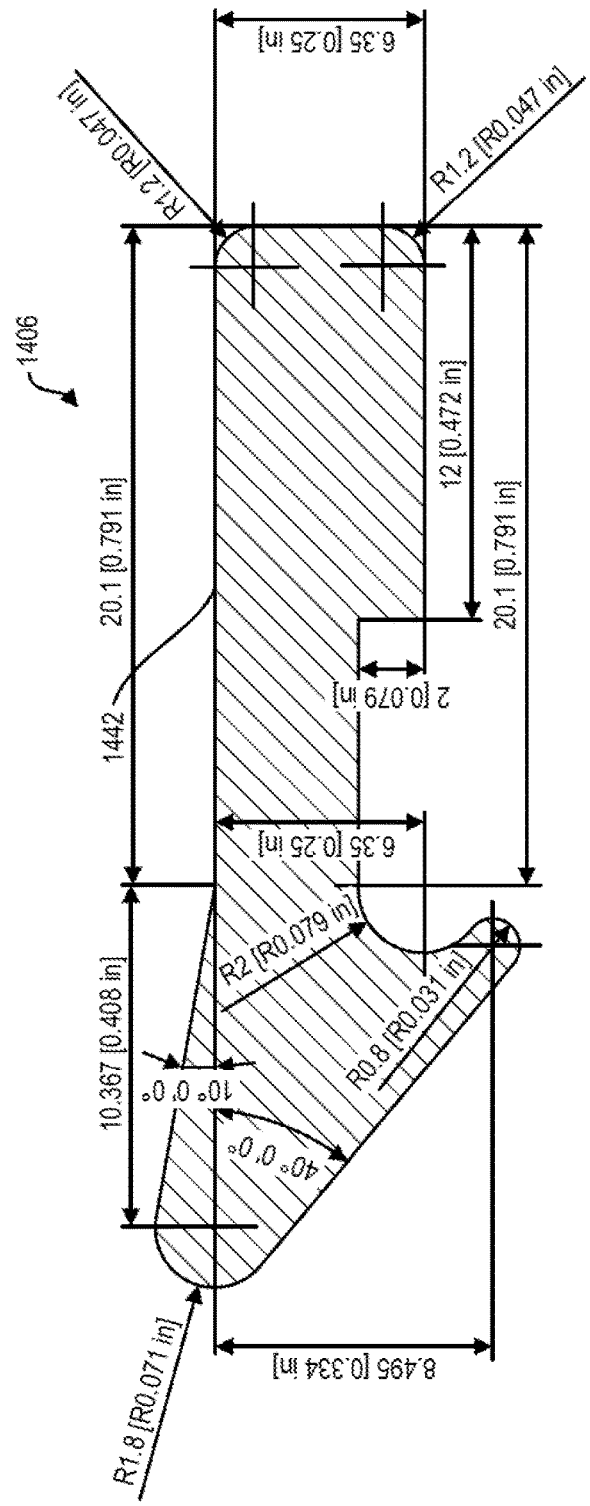
FIG. 14B is a cross-sectional view depicting the lockable pipeline seal of FIG. 14A.
Figure 16A:
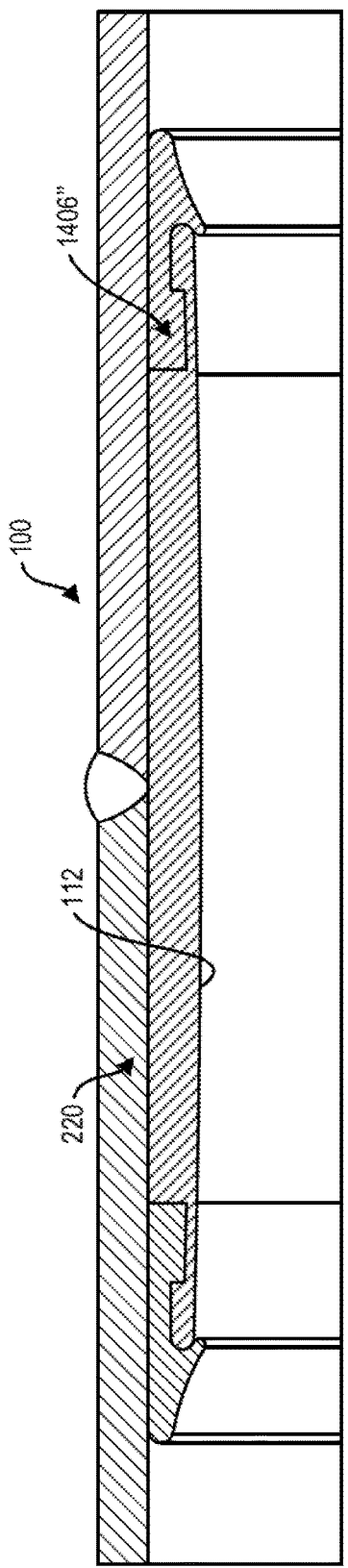
FIG. 16A is a cross-sectional view depicting a portion of the pipeline with the lockable pipeline seal of FIG. 15B in the compressed position therein.
Figure 16B:
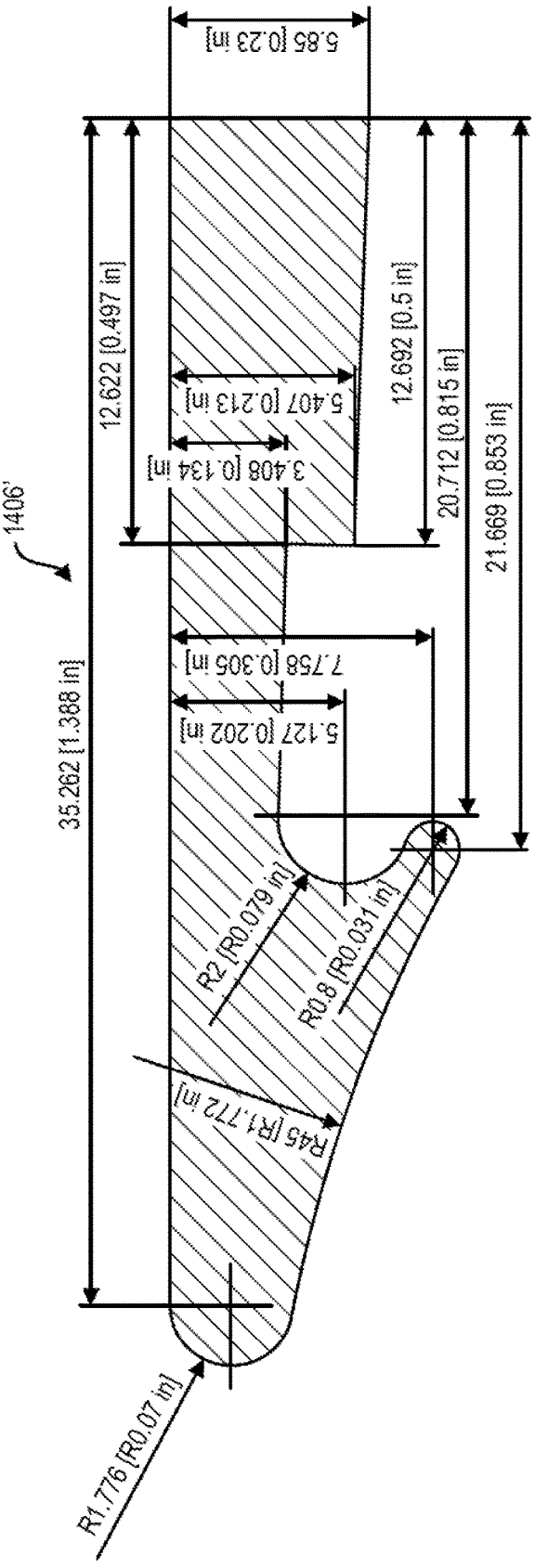
FIG. 16B is a cross-sectional view depicting the lockable pipeline seal of FIG. 16A.

Additional example dimensions for other lockable pipeline seals are shown in FIGS. 6B, 9B, and 14B (uninstalled), in FIGS. 7B, 10B, and 15B (installed), and compressed dimensions are shown in FIGS. 11B and 16B as is described further herein.

Figure 5A:
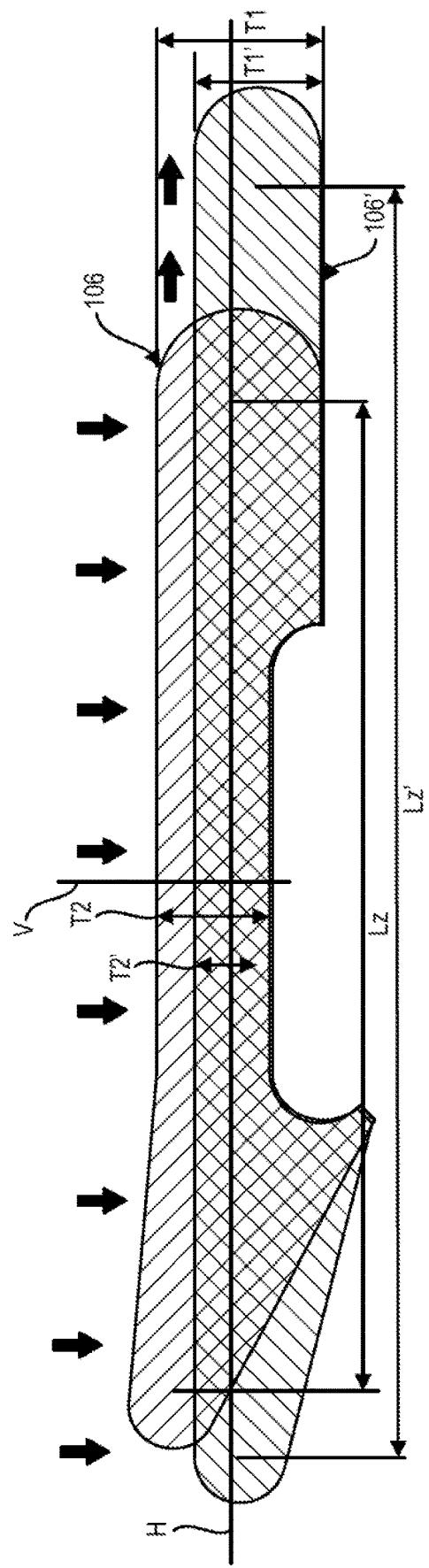
FIG. 5A is a schematic view depicting the lockable pipeline seal of FIG. 3B overlaid onto the lockable pipeline seal of FIG. 4B.
Figure 5B:
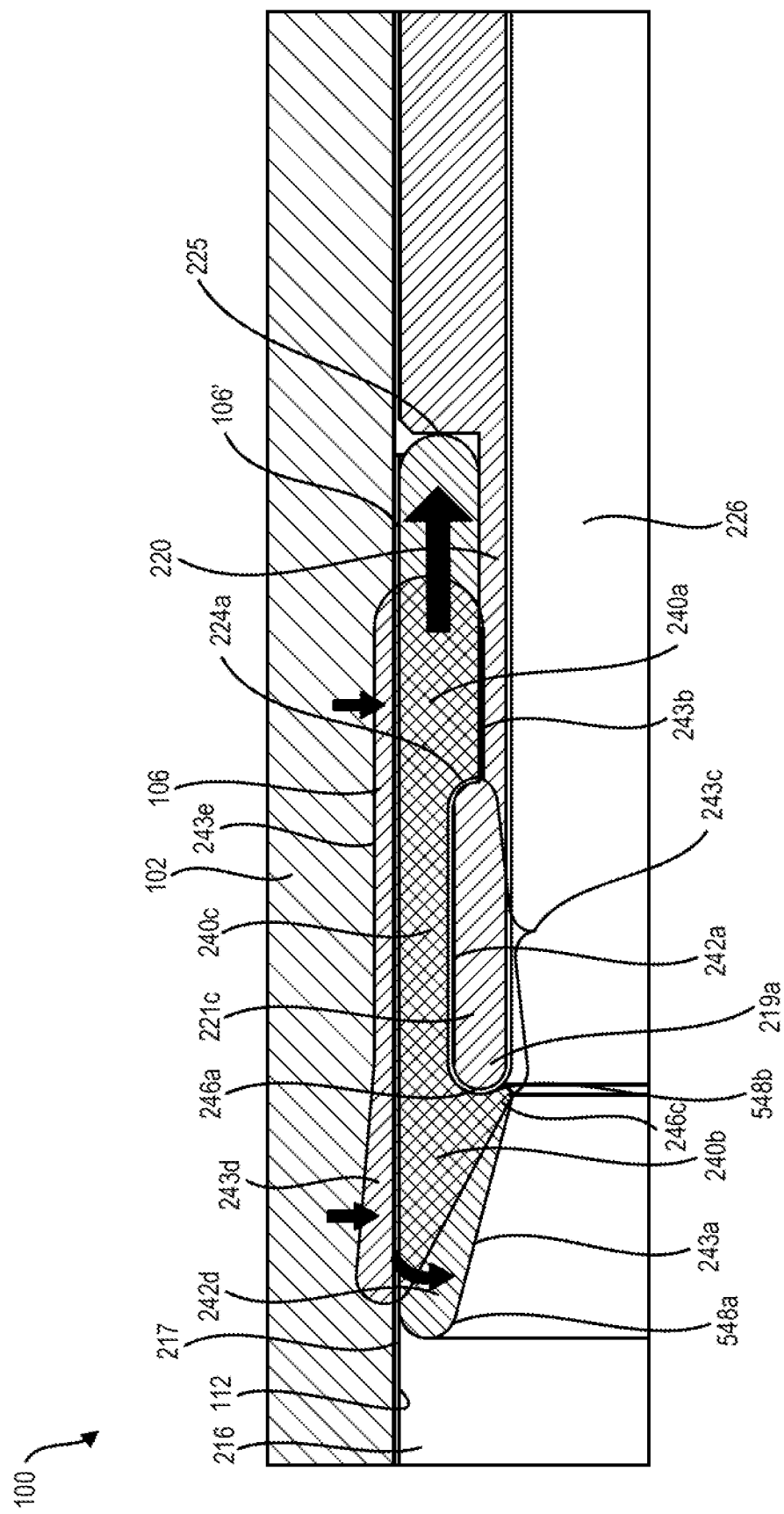
FIG. 5B is a schematic, cross-sectional view depicting a portion 5B of the pipeline connection of FIG. 2A depicting the lockable pipeline seals of FIG. 5A therein.

FIGS. 5A and 5B show a comparison of the uninstalled lockable pipeline seal 106 and the installed lockable pipeline seal 106'. FIG. 5A is a schematic view depicting the lockable pipeline seal 106 of FIG. 3B overlaid onto the lockable pipeline seal 106' of FIG. 4B. FIG. 5B is a schematic, cross-sectional view depicting a portion 5B of the pipeline connection 114 of FIG. 2A depicting the lockable pipeline seals 106, 106' of FIG. 5A therein.

As shown in these figures, when installed, the lockable pipeline seal 106' extends along its horizontal axis H as indicated by the horizontal arrows and deforms along its vertical axis V as indicated by the downward arrows. The thickness T1 of the rounded head 240a narrows to T1' as it is pressed between the pipeline pipe 102 and the inner sleeve 220, and the length elongates from Lz to Lz'. The rounded head 240a also presses against the sleeve step 225 as it elongates. The thickness T2 of the elongate body 240c narrows to T2' and flattens as it is pressed between the pipeline pipe 102 and the rim 221c of the sleeve body 220. The tail 240b deflects and the deflection surface 243d flatten as it is pressed along the inner surface 217 of the pipeline pipe 102. The contact surfaces 243b-e are pinched between the pipeline pipe 102, the sleeve body 220, the pipe lining 216 and the sleeve lining 226, and are urged thereagainst. This changes the contact seal to a stronger installation seal. The non-contact surface 243a is free to deform (e.g., flow and expand) into the passage 112 as needed.

As also shown in FIGS. 5A and 5B, the lockable pipeline seal 106, 106' is shaped to receivingly engage (e.g., grip) the rim 221c of the sleeve body 220. The gripping surface 243c extends along the curved head shoulder 244a, the curved tail shoulder 246a, and the inner surface 242a along the elongate body 240c, and is shaped to grippingly receive the rim 221c therein. The gripping surface 243c may grip the rim 221c with and/or without compression (e.g., pressure within the passage 112) to secure the lockable pipeline seal 106 about the first and second sleeve ends 219a,b of the sleeve body 220.

During installation, the deflection and flat surfaces 243d,e are urged against and conform to the inner surface 217 of the pipeline pipe 102. The tail 240b deflects away from the pipeline pipe 102. As the tail 240b deflects, the tail shoulder 246a rotates about the first and second sleeve end 219a,b of the sleeve body 220 for gripping engagement therewith. The tail end 242d of the tail 240b may be pressed against the pipe lining 216 to form a first lining seal 548a therewith. The round surface 246c may be pressed against the sleeve lining 226 to form a second lining seal 548b therewith.

FIGS. 6A-17B show variations of the lockable pipeline seal 106. As shown in these views, the lockable pipeline seal 106 may have various shapes and dimensions for forming the pipeline seal 111. Referring first to FIGS. 6A-8B, a wavy version of the lockable pipeline seal 606 is depicted. FIG. 6A is a cross-sectional view depicting a portion of the pipeline sleeve 104 with a wavy version of the lockable pipeline seal 606 in the uninstalled position thereon. FIG. 6B is a cross-sectional view depicting the lockable pipeline seal 606 of FIG. 6A. The lockable pipeline seal 606 is similar to the lockable pipeline seal 106 and is positioned about the sleeve end 219a (or 219b) of the pipeline sleeve 104 in a similar manner. The lockable pipeline seal 606 has a head 640a, tail 640b, and elongate body 640c, and an inner surface 642a, outer surface 642b, head end 642c, and tail end 642d.

The inner surface 642a has a length L7 that extends between the head end 642c of the head 640a and the tail end 642d of the rounded tail 640b. The rounded head 640a has a radius R5 and the rounded tail has a radius R6. The inner surface 642a has a flat surface 644c along the head 640a, a tapered surface 646b along the tail 640b, and a grip surface 643c along the elongate body 640c between the head 640a and the tail 640b. The flat surface 644c has a length L8.

The head 640a has an angled shoulder 644a between the grip surface 643c and the flat surface 644c. The head has a thickness T5. The angled shoulder has a thickness T6. The tail 640b has a curved tail shoulder 646a, the tapered surface 646b, and a tail surface 646c along the inner surface 642a. The tail surface 646c extends between the tail shoulder 646a and the tapered surface 646b. A tapered edge 650a is defined between the tapered surface 646b and the rounded surface 646c, and a shoulder edge 650b is defined between the tail shoulder 646a and the tail surface 646c.

The tail shoulder 646a has a radius R7. A thickness T7 extends from a centerline C3 of the tail shoulder 646a to the grip surface 643c along the elongate body 640c. The tail 640b has a length L9 between the tail end 642d and the tapered edge 650a, a length L10 between the tail end 642d and the shoulder edge 650b, and a length L11 between the tail end 642d and the centerline C3 of the tail shoulder 646a. A thickness T9 extends between the centerline C4 of the tail 640b and the shoulder edge 650b, and a thickness T8 extends between the centerline C4 of the tail 640b and the tapered edge 650a. The tapered surface 646b extends at an angle δ to the horizontal axis H.

The outer surface 642b is flat with multiple undulations 672 therealong. The undulations 672 define rounded peaks 674a and valleys 674b. A width W1 extends between each peak 674a and an adjacent valley 674b, except for a width W2 that extends between the centerline C4 and the adjacent valley 674b. The undulations 672 have a radius R8.

Figure 8A:
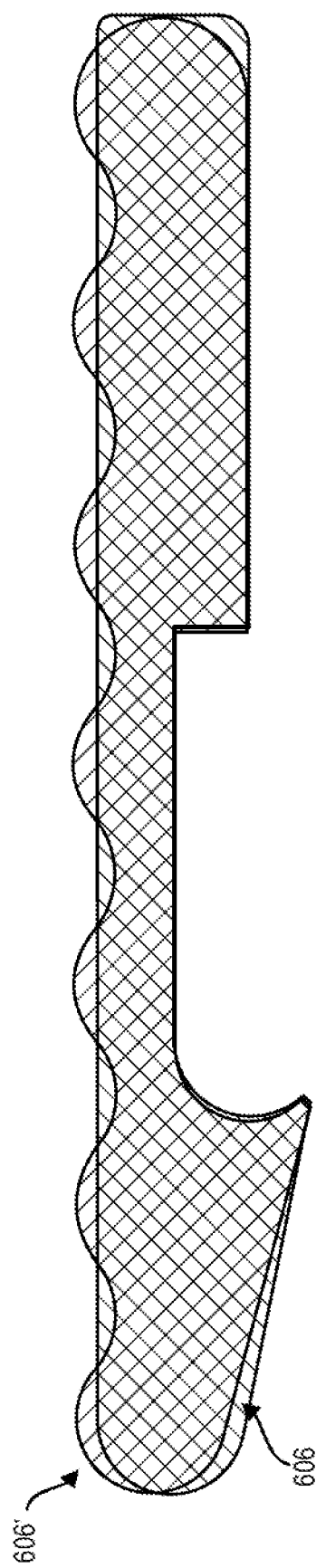
FIG. 8A is a schematic view depicting the lockable pipeline seal of FIG. 6B overlaid onto the lockable pipeline seal of FIG. 7B.
Figure 8B:
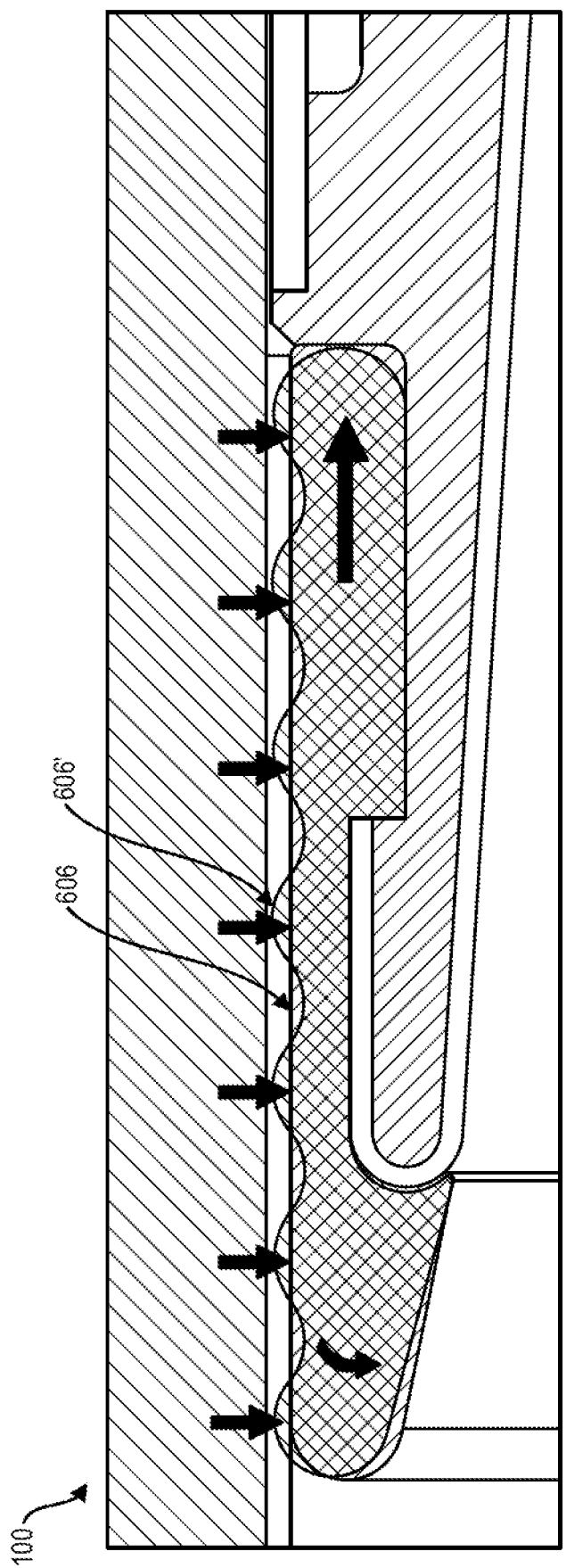
FIG. 8B is a cross-sectional view depicting a portion of the pipeline with the lockable pipeline seals of FIG. 8A therein.

FIG. 7A is a cross-sectional view depicting the pipeline sleeve 104 with the lockable pipeline seal 606' of FIG. 6A in the installed position thereon. FIG. 7B is a cross-sectional view depicting the lockable pipeline seal 606' of FIG. 7A. FIG. 8A is a schematic view depicting the lockable pipeline seal 606 of FIG. 6B overlaid onto the lockable pipeline seal 606' of FIG. 7B. FIG. 8B is a cross-sectional view depicting a portion of the pipeline 100 with the lockable pipeline seals 606, 606' of FIG. 8A therein. As shown in these views, the lockable pipeline seal 606' has changed shape after installation.

The lockable pipeline seal 606' has elongated, and the undulations 672 (FIGS. 6A and 6B) along the outer surface 642b have flattened. The head end 642c has conformed to the shape of the pipeline sleeve 104 to fill the seal space 230 between the pipe 102 and the pipeline sleeve 104 (FIG. 2A). The tail end 642d has deflected away from the pipes 102.

Table 2 below shows example dimensions for the uninstalled lockable pipeline seal 606 and the installed lockable pipeline seal 606':

TABLE 2

INSTALLED AND UNINSTALLED DIMENSIONS OF THE LOCKABLE PIPELINE SEAL - WAVY CONFIGURATION

| DIMENSION | UNINSTALLED VALUE | INSTALLED VALUE |
| --- | --- | --- |
| L7 | 50.04 mm | 50.29 mm |
| L8 | 20.85 mm | 20.85 mm |
| L9 | 13.13 mm | 13.28 mm |
| L10 | 13.41 mm | 13.56 mm |
| L11 | 15.20 mm | 15.37 mm |
| T5 | 5.87 mm | 5.20 mm |
| T6 | 2.52 mm | 2.52 mm |
| T7 | 2.54 mm | 2.54 mm |
| T8 | 5.16 mm | 4.48 mm |
| T9 | 5.44 mm | 4.76 mm |
| R5 | 2.93 mm | 0 mm |
| R6 | 2.53 mm | 2.53 mm |
| R7 | 2.54 mm | 2.54 mm |
| R8 | 2.93 mm | 0 mm |
| δ | 14 degrees 52 min | 11 degrees 24 min |

FIGS. 9A-13D show another version of the lockable pipeline seal in a deflection configuration. FIG. 9A is a cross-sectional view depicting the portion of the pipeline sleeve 104 with a compressible version of the lockable pipeline seal 906 in the uninstalled position. FIG. 9B is a cross-sectional view depicting the lockable pipeline seal 906 of FIG. 9A. FIG. 10A is a cross-sectional view depicting the portion of the pipeline sleeve 104 with the lockable pipeline seal 906' of FIG. 9B in an installed position therein. For descriptive purposes, the pipeline pipes 102 are not shown in FIG. 10A. FIG. 10B is a cross-sectional view depicting the lockable pipeline seal 906' of FIG. 9A in the installed position.

This version of the lockable pipeline seal 906, 906' is similar to the lockable pipeline seal 106, 106', except with different dimensions as shown in FIGS. 9B and 10B. For example, the head 940a is shorter. Also, the edges along the peripheral surface 942 of the lockable pipeline seal 906 have been rounded for ease of manufacture and/or for operability. The rounding of the edges may facilitate forming of the shape particularly in molding operations. The rounding of the edges may also facilitate installation of the lockable pipeline seal 906' and allow for flow into the seal space 230 (FIG. 2A).

FIGS. 11A and 11B show the lockable pipeline seal 906" after installation and compression. FIG. 11A is a cross-sectional view depicting a portion of the pipeline 100 with the lockable pipeline seal 906" of FIG. 9A in a compressed position therein. FIG. 11B is a cross-sectional view depicting the lockable pipeline seal 906" of FIG. 11A. As shown in these views, the lockable pipeline seal 906" may be shifted to a locked position after compression. Such compression may result, for example, from the flow of fluid through the passage 112.

Figure 12A:
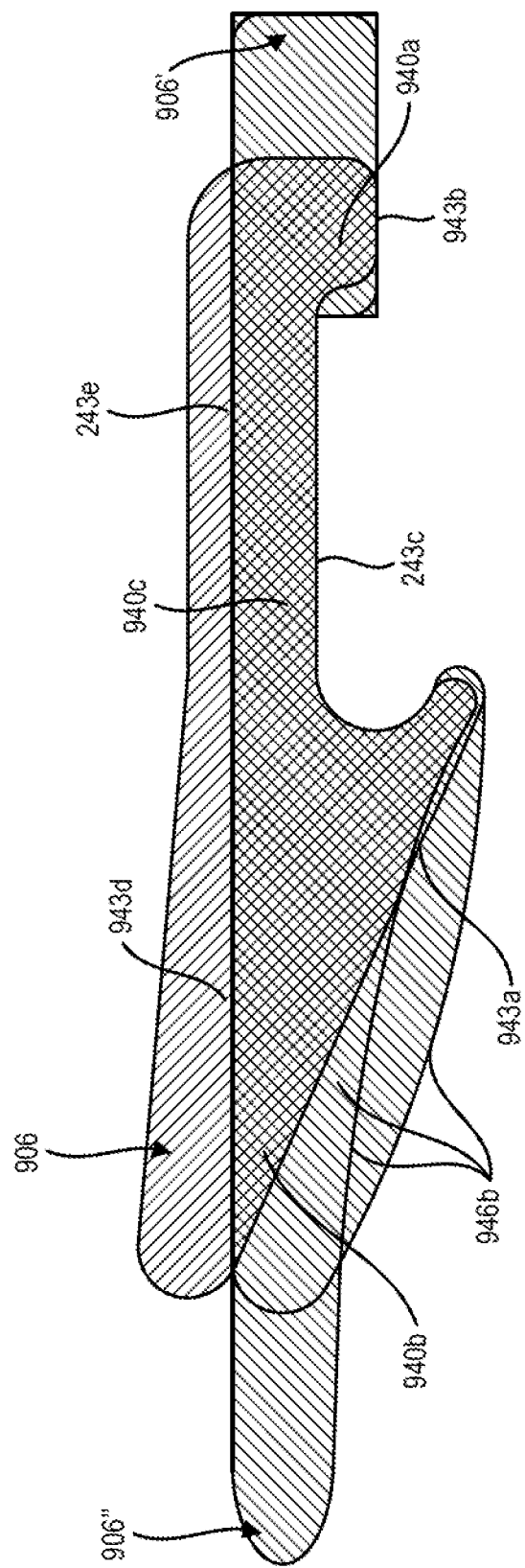
FIG. 12A is a schematic view depicting the lockable pipeline seals of FIGS. 10B and 11B overlaid onto the lockable pipeline seal of FIG. 9B.
Figure 12B:
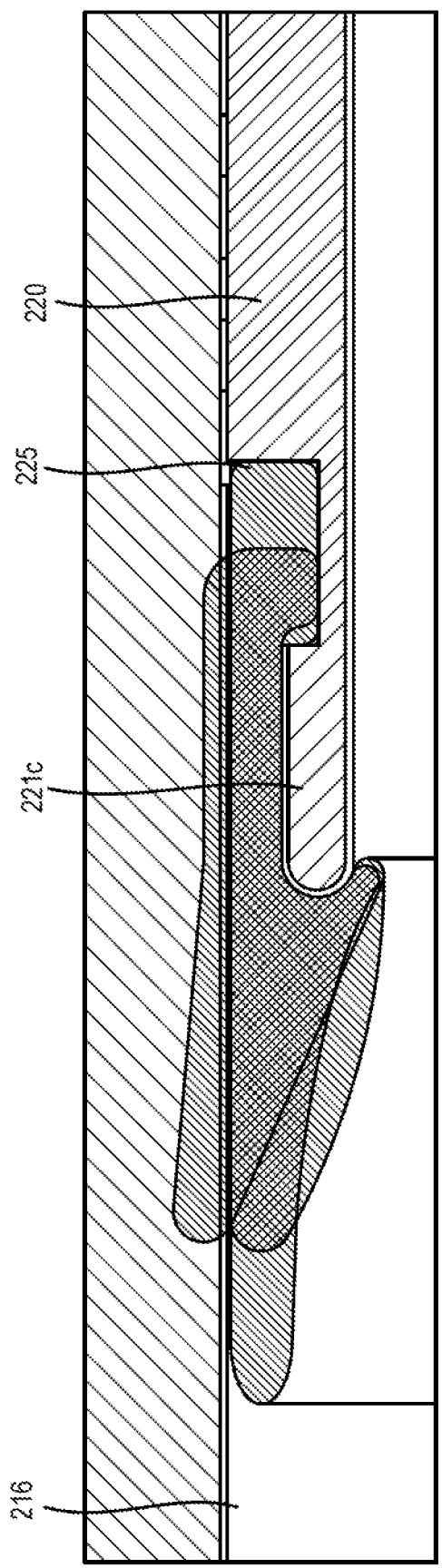
FIG. 12B is a schematic, cross-sectional view depicting a portion of the pipeline with the lockable pipeline seals of FIG. 12A therein.
Figure 13D:
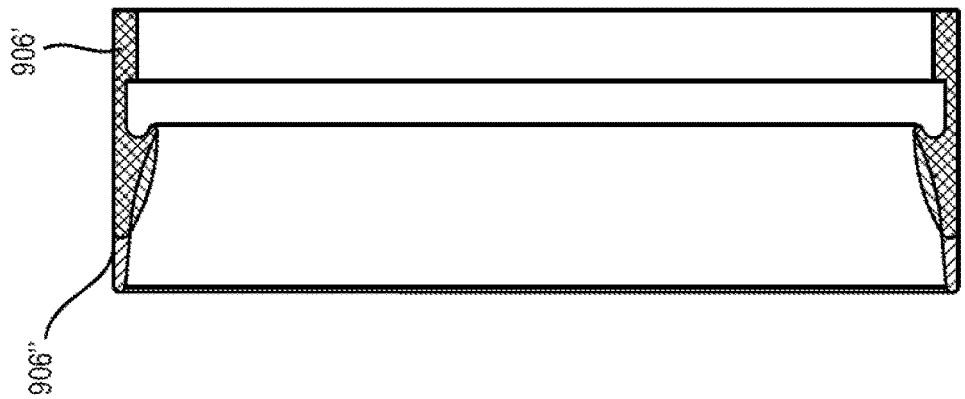
FIG. 13D is a cross-sectional view depicting a portion of the lockable pipeline seal of FIG. 10B overlaid onto the lockable pipeline seal of FIG. 11B.
Figure 13C:
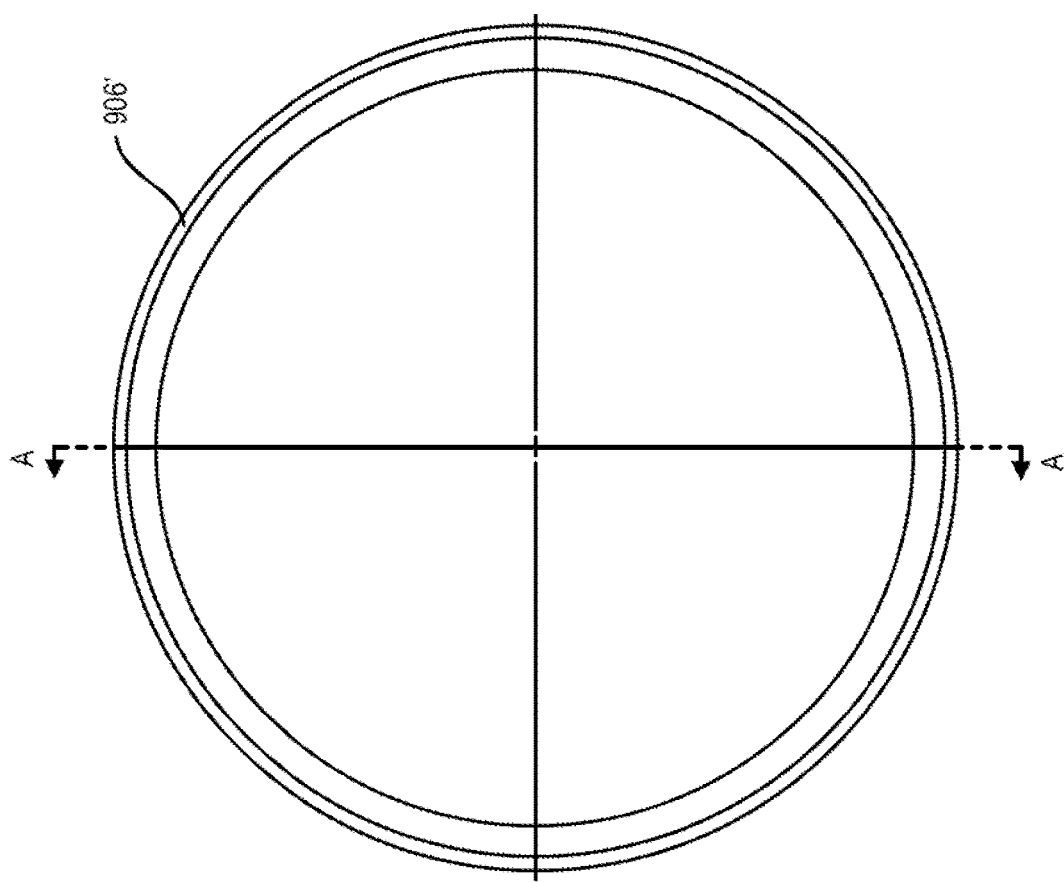
FIG. 13C is a plan view depicting the lockable pipeline seal of FIG. 11B.

FIGS. 12A and 12B provide a comparison of the lockable pipeline seal 906, 906', 906" in the uninstalled, installed, and locked position, respectively. FIG. 12A is a schematic view depicting the lockable pipeline seal 906' of FIG. 10B and the lockable pipeline seal 906" of FIG. 11B overlaid onto the lockable pipeline seal 906 of FIG. 9B. FIG. 12B is a schematic, cross-sectional view depicting a portion of the pipeline 100 with the lockable pipeline seals 906, 906', 906" of FIG. 12A therein. FIGS. 13A-13D show additional views of the lockable pipeline seal 906, 906', 906". FIG. 13A is a plan view depicting the lockable pipeline seal 906 of FIG. 9B. FIG. 13B is a cross-sectional view depicting a portion of the lockable pipeline seal 906 of FIG. 9B overlaid onto the lockable pipeline seal 906' of FIG. 10B. FIG. 13C is a plan view depicting the lockable pipeline seal 906" of FIG. 11B. FIG. 13D is a cross-sectional view depicting a portion of the lockable pipeline seal 906' of FIG. 10B overlaid onto the lockable pipeline seal 906" of FIG. 11B.

As shown by these views, the lockable pipeline seal 906" may change shape and dimension as a result of compression within the pipeline 100. This compression may further urge the contact surfaces 943b-e into contact with the pipeline pipes 102 and the pipeline sleeve 104, thereby increasing the strength of the seal to a locked seal. In this locked position, the lockable pipeline seal 906" is energized and urged into a strong seal and a secure position to prevent the passage of fluid therebetween.

As depicted in FIGS. 10B, 12A, and 12B, the dimensions and shape of this lockable pipeline seal 906' changes shape when installed. Once installed, the tail 940b deflects as with the tail 240b in FIG. 4B. In this example, the non-contact surface 943b along the tapered surface 946b expands into the passage 112 to a convex shape. Once placed under compression, the tail 940b extends and the tapered surface 946b retracts to a concave shape. The body portion 940c thins and elongates to allow the tail 940b to contact the pipe lining 216 and to allow the head 940a to expand and contact the step 225 of the sleeve body 220 and the rim 221c.

FIGS. 14A-17D show another version of the lockable pipeline seal 1406 in a deflection configuration. FIG. 14A is a cross-sectional view depicting the portion of the pipeline sleeve 104 with a compressible version of the lockable pipeline seal 1406 in the uninstalled position. FIG. 14B is a cross-sectional view depicting the lockable pipeline seal 1406 of FIG. 14A. FIG. 15A is a cross-sectional view depicting the portion of the pipeline sleeve 1404 with the lockable pipeline seal 1406' of FIG. 14B in an installed position therein. FIG. 15B is a cross-sectional view depicting the lockable pipeline seal 1406' of FIG. 14A in the installed position.

This version of the lockable pipeline seal 1406, 1406' is similar to the lockable pipeline seal 906, 906', and 906" except with different dimensions as shown in FIGS. 14B, 15B, and 16B. In this version, some of the edges along the peripheral surface 1442 of the lockable pipeline seal 1406 have been sharpened and some have remained curved for operability. The sharpened edges may be used, for example, to facilitate filling of the recess 227 and/or the seal space 230 between the pipeline pipes 102 and the pipeline sleeve 104 (FIG. 2A).

FIGS. 16A and 16B show the lockable pipeline seal 1406" after installation and compression. FIG. 16A is a cross-sectional view depicting a portion of the pipeline 100 with the lockable pipeline seal 1406" of FIG. 15B in a locked position therein. FIG. 16B is a cross-sectional view depicting the lockable pipeline seal 1406" of FIG. 16A. As shown in these views, the lockable pipeline seal 1406" may be shifted to a locked position after compression. Such compression may result, for example, from the flow of fluid through the passage 112.

Figure 17A:
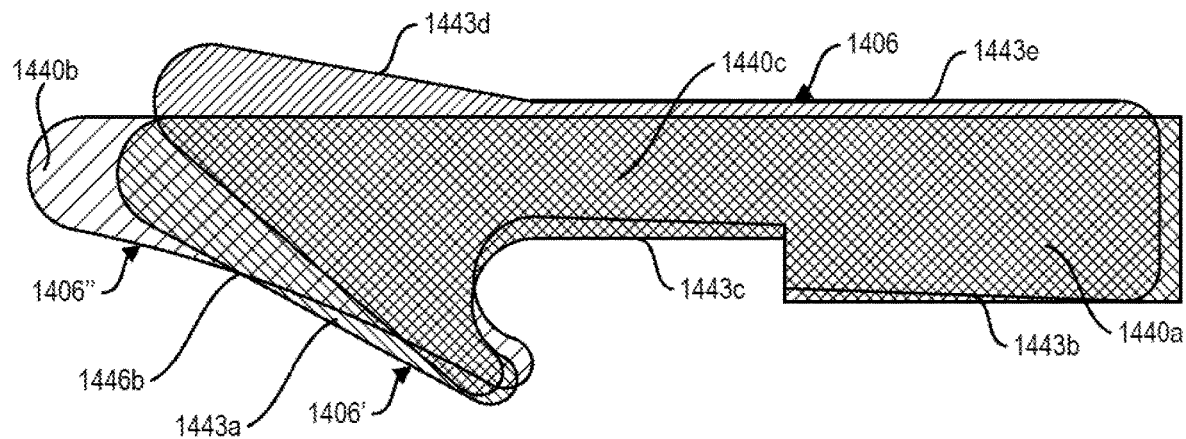
FIG. 17A is a schematic view depicting the lockable pipeline seals of FIGS. 15B and 16B overlaid onto the lockable pipeline seal of FIG. 14B.
Figure 17B:
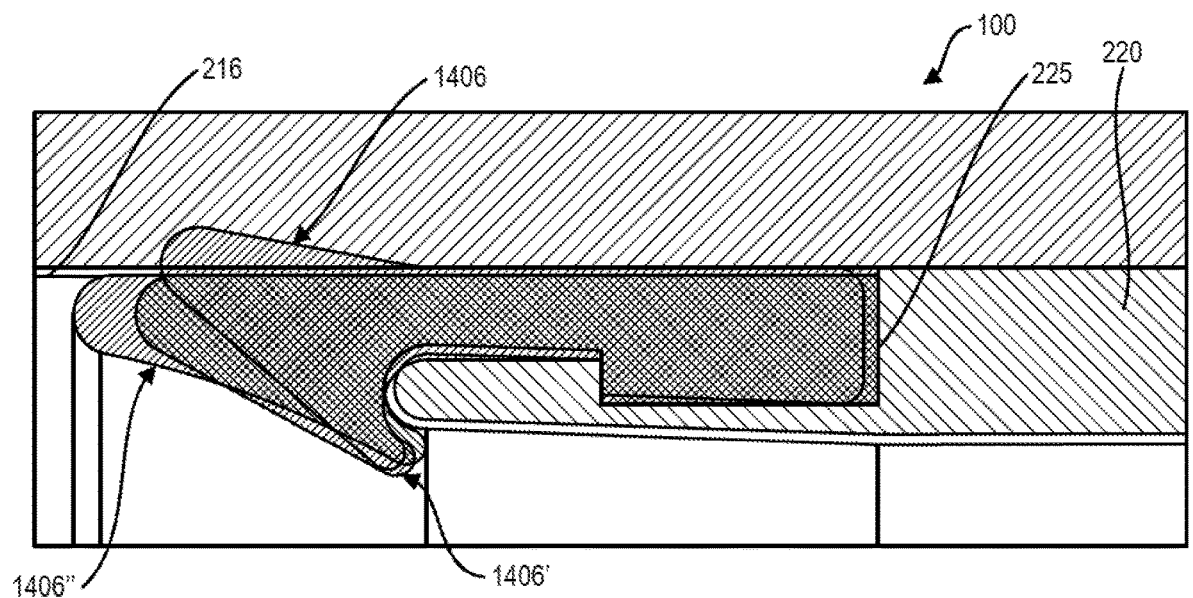
FIG. 17B is a schematic, cross-sectional view depicting a portion of the pipeline with the lockable pipeline seals of FIG. 17A therein.

FIGS. 17A and 17B provide a comparison of the lockable pipeline seal 1406, 1406', 1406" in the uninstalled, installed, and locked position, respectively. FIG. 17A is a schematic view depicting the lockable pipeline seal 1406' of FIG. 17B and the lockable pipeline seal 1406" of FIG. 17B overlaid onto the lockable pipeline seal 1406 of FIG. 14B. FIG. 17B is a schematic, cross-sectional view depicting a portion of the pipeline 100 with the lockable pipeline seals 1406, 1406', 1406" of FIG. 14B therein.

As shown by these views, the lockable pipeline seal 1406" may change shape and dimension as a result of compression within the pipeline 100. This compression may further urge the contact surfaces 1443b-e into contact with the pipeline pipes 102 and the pipeline sleeve 104, thereby increasing the strength of the seal to a locked seal. In this locked position, the lockable pipeline seal 1406" is energized and urged into a strong seal and a secure position to prevent the passage of fluid between the pipeline pipe 102 and the pipeline sleeve 104.

As depicted in FIGS. 17A and 17B, the dimensions and shape of this lockable pipeline seal 1406' changes shape when installed. Once installed, the tail 1440b deflects in a similar manner as the tail 940b of FIG. 10B. In this example, the non-contact surface 1443a along the tapered surface 1446b remains flat when installed. Once placed under compression, the tail 1440b extends and the tapered surface 1446b retracts to a concave shape. The body portion 1440c thins, the tail 1440b extends to contact the pipe lining 216, and the head 1440a expands for contact with the step 225 of the sleeve body 220 and remains in contact with the rim 221c.

While various versions and features of the lockable pipeline seals are provided, it will be appreciated that further variations may be provided. For example, one or more features of any of the lockable pipeline seals may be provided on another of the pipeline seals.

Figure 18:
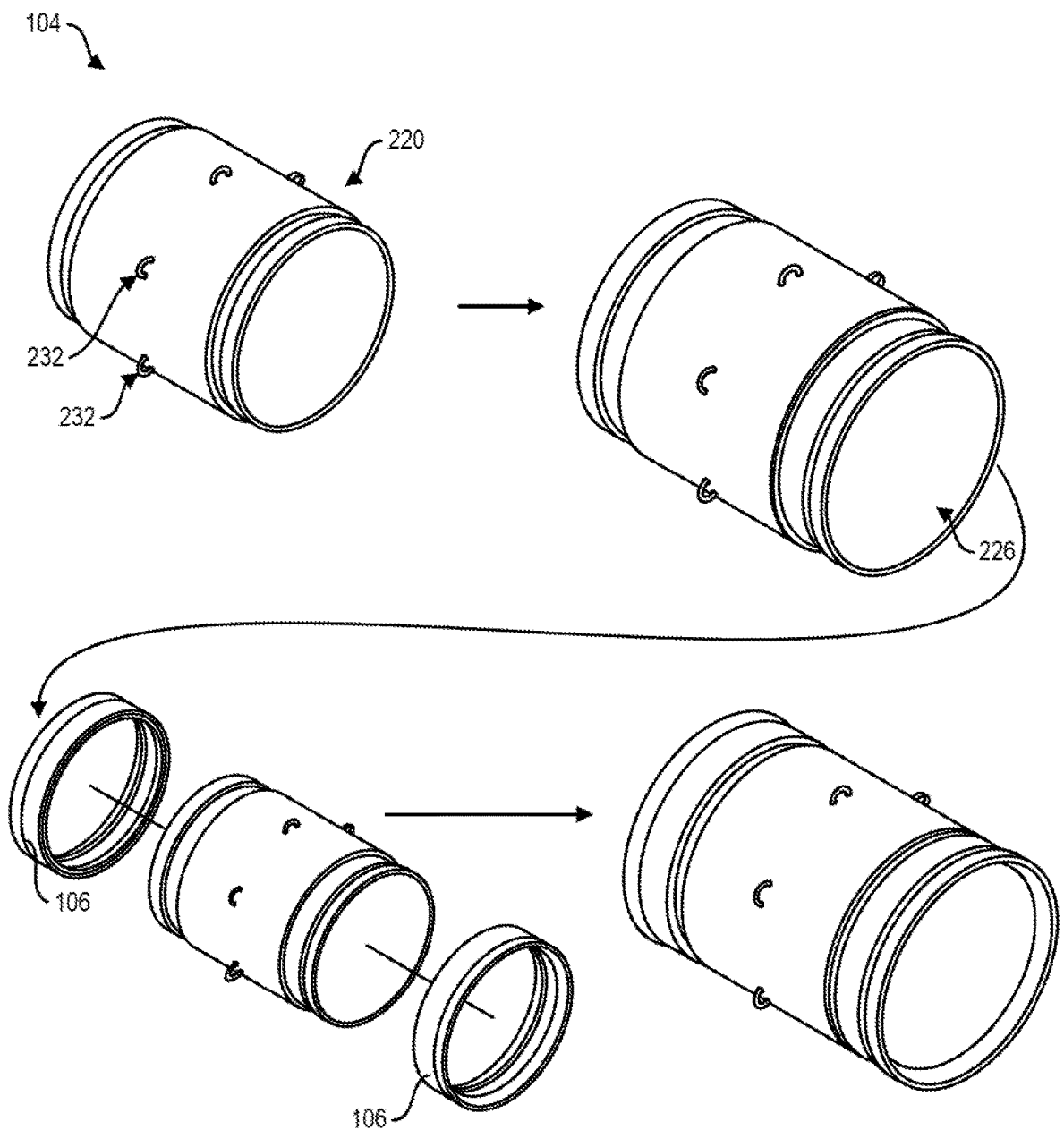
FIG. 18 is a schematic diagram depicting stages of assembly of the pipeline sleeve.

FIGS. 18-20F show assembly of the pipeline sleeve 104, the pipeline connection 114, and the pipeline 100. FIG. 18 is a schematic diagram depicting stages of assembly of the pipeline sleeve 104. FIGS. 19A-19D are schematic diagrams depicting stages of assembly and operation of the pipeline connection 114 with the lockable pipeline seal 106, 106' of FIG. 5B therein. FIGS. 20A-20F are schematic diagrams depicting stages of assembly of the pipeline connection 114 with the lockable pipeline seal 906, 906', and 906" of FIG. 12B therein.

As shown in the example of FIG. 18, the pipeline sleeve 104 is assembled by positioning the sleeve lining 226 on the inner surface of the sleeve body 220, applying the lockable pipeline seals 106 to each end of the sleeve body 220 with the sleeve lining 226 thereon. The spacers 232 may also applied to the outer surface of the sleeve body 220 at any time during the assembly of the pipeline sleeve 104. This process may be used with any sleeve and with any version of the lockable pipeline seals.

Figure 19A:
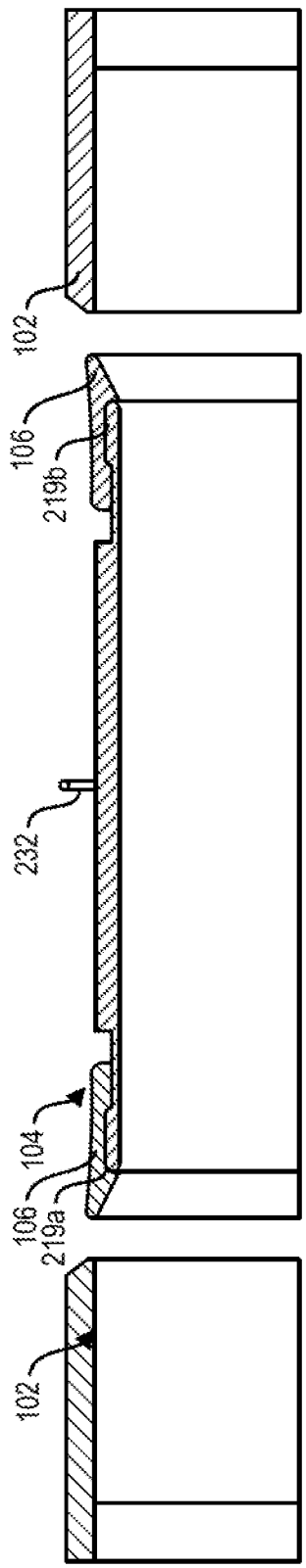
Figure 19B:
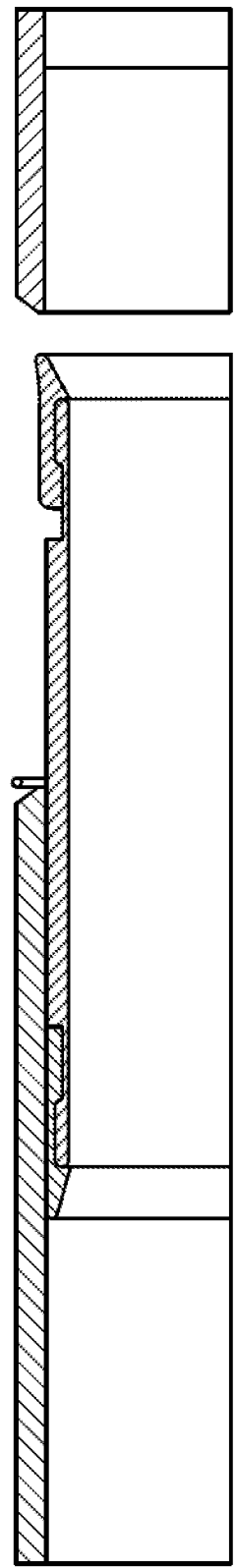

As shown in FIGS. 19A-19D, the pipeline sleeve 104 is positioned in axial alignment with the adjacent pair of the pipeline pipes 102 for insertion therein. As shown in FIG. 19B, the first sleeve end 219a of the pipeline sleeve 104 is inserted into one pipeline pipe 102. As shown in FIG. 19C, the pipeline pipe 102 is positioned onto the second sleeve end 219b of the pipeline sleeve 104. As also shown in FIG. 19C, the adjacent pipeline pipes 102 are joined. In the example of FIGS. 19B and 19C, the pipeline pipes 102 are advanced onto the pipeline sleeve 104 for contact with the connection spacers 232. Once the pipeline pipes 102 are in an abutted positioned adjacent the spacers 232, the spacers 232 may be removed. In the example of FIG. 19D, the weld 215 is formed between the pipeline pipes 102.

Figure 20D:
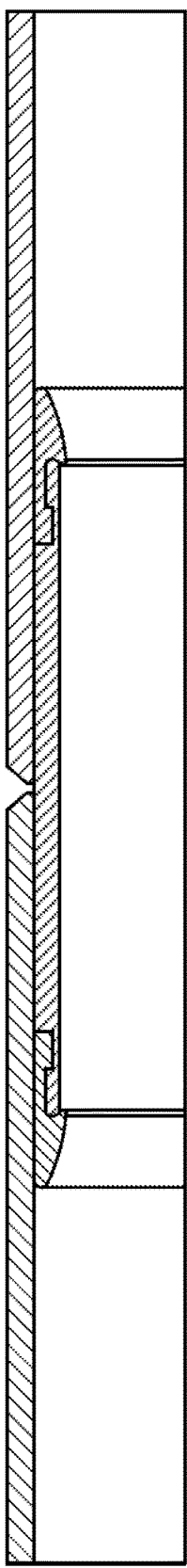
Figure 20E:
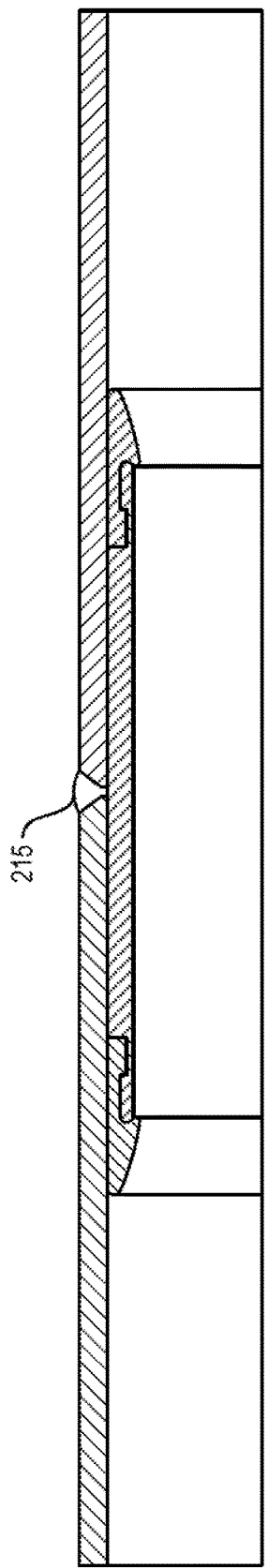
Figure 20F:
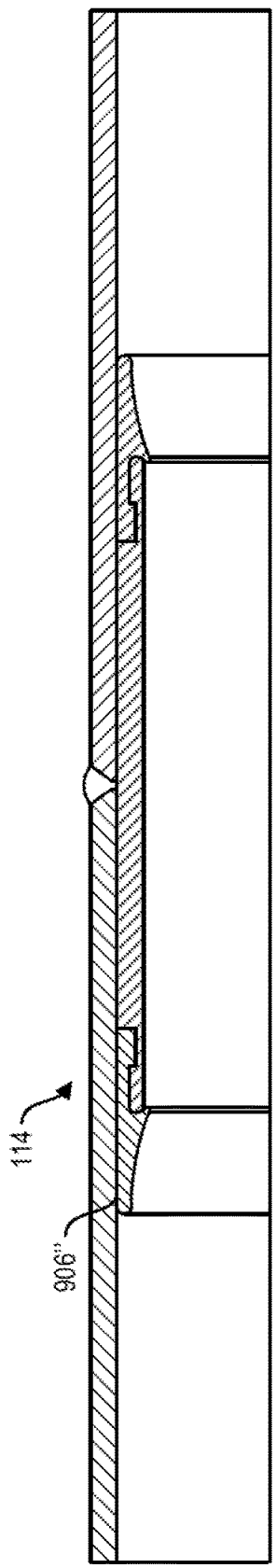

In the version of in FIG. 20A-20F, the pipeline assembly and operation are depicted. FIGS. 20A-20C show the pipeline connection 114 formed by inserting the pipeline sleeve 104 into the pipeline pipes 102 in a similar manner as described in FIGS. 19A-19C. FIG. 20D shows removal of the spacer 232. FIG. 20E shows insertion of the weld 215 in a similar manner as in FIG. 19D. FIG. 20E then shows compression applied to the lockable pipeline seal 906" to form the lock seal about the pipeline connection 114.

While a specific order and configuration of assembly of the pipeline sleeve 104 and the pipeline connections 114 are shown, it will be appreciated that the order, positioning, structure, and assembly may vary. Other versions of the seals and/or sleeves described herein may be used with the assembly and operation shown in FIGS. 18-20F. Part or all of the assembly may be performed on or offsite from the wellsite.

FIGS. 21A and 21B show example methods 2100A, B that may be performed in accordance with the disclosure. FIG. 21A is a flow chart depicting a method 2100A of making a sealed pipeline.

As shown in FIG. 21A, the sealed pipeline (e.g., 100 of FIG. 1) may be made by (2180) forming a pipeline sleeve by installing lockable pipeline seals onto a pipeline sleeve, (2182) installing the pipeline sleeve into a pair of pipeline pipes, each of the pair of pipeline pipes having a first pipe end and a second pipe end, (2184) forming a sealed connection about the pair of pipeline pipes, (2186) locking the lockable pipeline seal into the sealing engagement, and (2188) securing the pipeline pipes together.

The forming (2180) may involve (2180a) positioning a first lockable pipeline seal onto an outer surface of a first sleeve end of the pipeline sleeve and a second lockable pipeline seal onto an outer surface of a second sleeve end of the pipeline sleeve. Also, (2180b) the lockable pipeline seal comprises a ring-shaped body (member) having a head, a tail, and a body portion therebetween, the lockable pipeline seal having a peripheral surface comprising: an outer surface shaped to conform to the inner surface of the pair of pipeline pipes and an inner surface defining a seal grip shaped to conform to the sleeve end of the pipeline sleeve.

The installing (2182) may involve (2182a) inserting a first sleeve end of the pipeline sleeve into the first pipe end of a first of the pair of pipeline pipes and, (2182b) inserting a second sleeve end of the pipeline sleeve into the second pipe end of a second of the pair of pipelines pipes.

The forming (2184) may involve (2184a) placing a contact portion of a peripheral surface of the lockable pipeline seals into sealing engagement with the pipeline pipes, the pipeline sleeve, and/or a liner of the pipeline pipes, (2184b) grippingly engaging a rim along of the pipeline sleeve with the seal grip, and (2184c) maintaining a non-contact portion of the peripheral surface of the lockable pipeline seals in non-contact with the pipeline pipes, the pipeline sleeve, and a liner of the pipeline pipes.

The locking (2186) may involve (2186A) allowing the lockable pipeline seal to flow under compression such that the contact surface is urged against and conforms to a shape of the pipeline pipes, the pipeline sleeve, and a liner of the pipeline pipes in contact therewith and such that a seal space defined therebetween is filled by the lockable pipeline seal.

FIG. 21B is a flow chart depicting a method 2100B of sealing a pipeline. The method (2180B) involves (2190) forming a pipeline connection between a pair of pipeline pipes and a pipeline sleeve, and (2192) forming a fluid tight seal about the pipeline connection. The forming (2190) involves (2190a) (optionally) applying a liner inside each of the pair of pipeline pipes, (2190b) positioning a first sleeve end of a pipeline sleeve with a lockable pipeline seal thereon into a first pipe end of a first of the pair of pipeline pipes, (2190c) positioning a second sleeve end of a pipeline sleeve with the lockable pipeline seal thereon into a second pipe end of a second of the pair of pipeline pipes, and (2190d) with the pipeline sleeve positioned therein, securing the first pipe end of the first pipeline pipe to the second pipe end of the second pipeline pipe.

The forming (2192) involves (2192a) placing a contact surface of the lockable pipeline seal into contact with the pipeline pipe and the pipeline sleeve (and optionally the pipeline liner); (2192b) while maintaining a non-contact portion of the lockable pipeline seal in non-contact with the pipeline pipe and the pipeline sleeve (and optionally the pipeline liner); and (2192c) locking the fluid tight seal by: placing the lockable pipeline seal under compression such that the contact surfaces are urged against the pipeline pipe and the pipeline sleeve (and optionally the pipeline liner).

Part or all of the method may be performed in various order and repeated as desired.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top", "bottom", "anterior" and "posterior" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain connectors are provided herein, it will be appreciated that various forms of connection may be provided. While the figures herein depict a specific configuration or orientation, these may vary. First and second are not intended to limit the number or order.

What is claimed is:

1. A lockable pipeline seal for a pipeline, the pipeline comprising pipeline pipes and a pipeline sleeve, a tubular sleeve body insertable into the pipeline pipes; lockable pipeline seals positioned on the tubular sleeve body, the lockable pipeline seal comprising: a ring-shaped body having a head along a first ring end of the ring-shaped body and a tail along a second ring end of the ring-shaped body with a body portion between the head and the tail, the ring-shaped body having an outer surface and an inner surface along a periphery of the ring-shaped body, a deflection surface and a base surface defined along the outer surface, the deflection surface at an angle to a horizontal axis of the ring-shaped body, the deflection surface with the angle radially outwardly from the base surface; a recessed grip defined along the inner surface; and wherein the ring-shaped body is compressible such that, when the ring-shaped body is installed between the pipeline sleeve and the pipeline pipe, the deflection surface is urged against the pipeline pipe and the recessed grip grippingly engages the pipeline sleeve whereby a locked seal is formed between the pipeline sleeve and the pipeline pipe;
wherein the tail has a curved tail shoulder along the inner surface between a tapered surface and the body portion and wherein the tail has a grip tip defined along the curved tail shoulder and the tapered surface, the grip tip aligned horizontally with an inner radial surface of the tubular sleeve body of the pipeline seal.

2. The lockable pipeline seal of claim 1, wherein the tail has a tapered tip.

3. The lockable pipeline seal of claim 2, wherein the tapered tip has a tapered surface along the inner surface and wherein, when the ring-shaped body is installed between the pipeline sleeve and the pipeline pipes, the tapered tip is in non-contact with the pipeline pipes and the pipeline sleeve.

4. The lockable pipeline seal of claim 1, wherein, when the ring-shaped body is installed between the pipeline sleeve and the pipeline pipe, the tail rotates about an end of the pipeline sleeve.

5. The lockable pipeline seal of claim 1, wherein the ring-shaped body has at least one of curved edges and sharp edges about the periphery.

6. The lockable pipeline seal of claim 1, wherein the head has a head portion along the inner surface.

7. The lockable pipeline seal of claim 1, wherein, when the ring-shaped body is installed between the pipeline sleeve and the pipeline pipes and compressed therein, at least one of the head and the tail elongates.

8. The lockable pipeline seal of claim 1, wherein the outer surface is wavy.

9. The lockable pipeline seal of claim 1, wherein the recessed grip is defined along a curved tail shoulder of the tail, a gripping surface of the body portion, and a curved head shoulder of the head.

10. A pipeline sleeve for sealing pipeline pipes of a pipeline, the pipeline sleeve comprising: a tubular sleeve body insertable into the pipeline pipes; lockable pipeline seals positioned on the tubular sleeve body, each of the lockable pipeline seals comprising: a ring-shaped body having a head along a first ring end of the ring-shaped body and a tail along a second ring end of the ring-shaped body with a body portion between the head and the tail, the ring-shaped body having an outer surface and an inner surface along a periphery of the ring-shaped body, a deflection surface and a base surface defined along the outer surface, the deflection surface at an angle to a horizontal axis of the ring-shaped body, the deflection surface with the angle radially outwardly from the base surface; a recessed grip defined along the inner surface; and wherein the ring-shaped body is compressible such that, when the ring-shaped body is installed between the pipeline sleeve and the pipeline pipe, the deflection surface is urged against the pipeline pipe and the recessed grip grippingly engages the pipeline sleeve whereby a locked seal is formed between the pipeline sleeve and the pipeline pipe; wherein the tail has a curved tail shoulder along the inner surface between a tapered surface and the body portion and wherein the tail has a grip tip defined along the curved tail shoulder and the tapered surface, the grip tip aligned horizontally with an inner radial surface of the tubular sleeve body of the pipeline seal.

11. The pipeline sleeve of claim 10, further comprising a sleeve lining along an inner surface of the tubular sleeve body.

12. The pipeline sleeve of claim 10, wherein the tubular sleeve body has recessed sleeve shoulders with a raised central portion therebetween.

13. The pipeline sleeve of claim 12, wherein each of the recessed sleeve shoulders comprises a rim and a recess.

14. The pipeline sleeve of claim 13, wherein the recessed grip grippingly engages the rim.

15. The pipeline sleeve of claim 13, wherein the recess receivably engages the head.

16. The pipeline sleeve of claim 10, wherein the tail extends from an end of the tubular sleeve body.

17. A sealed pipeline connection, comprising: pipeline pipes with a fluid passage therethrough, a first end of a first of the pipeline pipes positioned adjacent a second end of a second of the pipeline pipes; a pipeline sleeve positioned in the fluid passage, the pipeline sleeve extending into the first end of the first of the pipeline pipes and the second end of the second of the pipeline pipes; and lockable pipeline seals positioned at each end of the pipeline sleeve, each of the lockable pipeline seals comprising: a ring-shaped body having a head along a first ring end of the ring-shaped body and a tail along a second ring end of the ring-shaped body with a body portion between the head and the tail, the ring-shaped body having an outer surface and an inner surface along a periphery of the ring-shaped body, a deflection surface and a base surface defined along the outer surface, the deflection surface at an angle to a horizontal axis of the ring-shaped body, the deflection surface with the angle radially outwardly from the base surface; a recessed grip defined along the inner surface; and wherein the ring-shaped body is compressible such that, when the ring-shaped body is installed between the pipeline sleeve and the pipeline pipe, the deflection surface is urged against the pipeline pipe and the recessed grip grippingly engages the pipeline sleeve whereby a locked seal is formed between the pipeline sleeve and the pipeline pipe; wherein the tail has a curved tail shoulder along the inner surface between a tapered surface and the body portion and wherein the tail has a grip tip defined along the curved tail shoulder and the tapered surface, the grip tip aligned horizontally with an inner radial surface of the tubular sleeve body of the pipeline seal.

18. The sealed pipeline connection of claim 17, wherein, when compressed fluid passes through the fluid passage, the ring-shaped body is compressed against the pipeline pipes.

19. The sealed pipeline connection of claim 17, wherein when compressed fluid passes through the fluid passage, the ring-shaped body is compressed against the pipeline sleeve.

20. The sealed pipeline connection of claim 17, wherein the first end of the first of the pipeline pipes is secured to the second end of the second of the pipeline pipes by a weld.

21. A method of making a sealed pipeline, comprising:
forming a pipeline sleeve by installing the lockable pipeline seal of claim 1 onto each end of the pipeline sleeve, each of the lockable pipeline seals comprising a ring-shaped member having a head, a tail, and a body portion therebetween, the lockable pipeline seal having an inner surface and an outer surface, the outer surface comprising an angled deflection surface along the tail and the inner surface comprising a grip;
installing a first end of the pipeline sleeve into a first end of a first of the pipeline pipes and installing a second end of a second of the pipeline pipes onto a second end of the pipeline sleeve; and
forming a sealed pipeline connection between the pipeline sleeve and the first and second of the pipeline pipes by urging the angled deflection surface of the lockable pipeline seals against the pipeline pipe and the gripping the grip about the pipeline sleeve.

22. The method of claim 21, further comprising, during the forming, maintaining a non-contact portion of the lockable pipeline seals in non-contact with the pipeline pipes and the pipeline sleeve.

23. The method of claim 21, further comprising locking the lockable pipeline seals into sealing engagement by allowing the lockable pipeline seals to flow under compression such that the lockable pipeline seals conform to a shape of the pipeline pipes and the pipeline sleeve.

24. The method of claim 21, further comprising applying a liner to one of the pipeline sleeve, the pipeline pipes, and combinations thereof.

25. The method of claim 24, further comprising forming a seal between each of the lockable pipeline seal and the liner of one of the pipeline sleeve, the pipeline pipes, and combinations thereof.

26. The method of claim 21, further comprising securing the pipeline pipes together.

27. A method of sealing a pipeline, comprising:
forming a pipeline connection between a pair of pipeline pipes and a pipeline sleeve by:
positioning a first sleeve end of the pipeline sleeve with the lockable pipeline seal of claim 1 thereon into a first pipe end of a first of the pair of pipeline pipes;
positioning a second sleeve end of the pipeline sleeve with the lockable pipeline seal thereon into a second pipe end of a second of the pair of pipeline pipes; and
with the pipeline sleeve positioned therein, securing the first pipe end of the first of the pair of pipeline pipes to the second pipe end of the second of the pair of pipeline pipes; and
forming a fluid tight seal about the pipeline connection by:
placing a contact surface of the lockable pipeline seal into contact with the pipeline pipe and the pipeline sleeve while maintaining a non-contact portion of the lockable pipeline seal in non-contact with the pipeline pipe and the pipeline sleeve; and
locking the fluid tight seal by placing the lockable pipeline seal under compression such that the contact surfaces are urged against the pipeline pipe and the pipeline sleeve and the non-contact portion is free to flow about the pipeline sleeve and the pipeline pipe.

* * * * *